July 4, 1944.   O. B. WEBSTER ET AL   2,352,986
BLOCK SIGNALING SYSTEM FOR RAILROADS
Filed May 7, 1941   14 Sheets-Sheet 5
FIG.2.A.
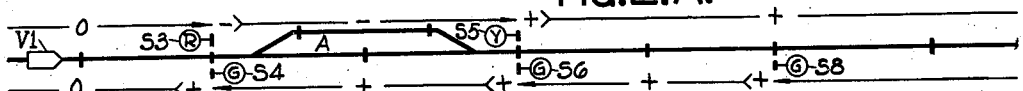
FIG.3.A.
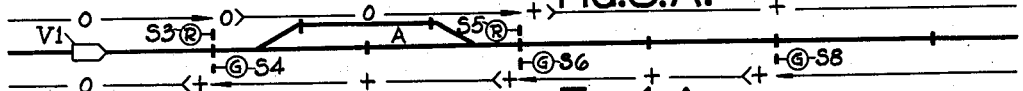
FIG.4.A.
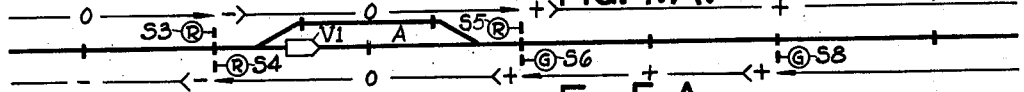
FIG.5.A.
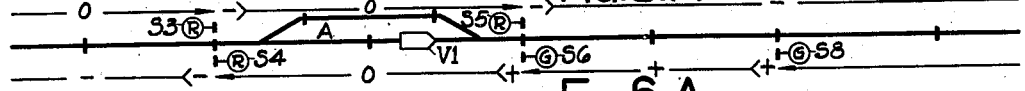
FIG.6.A.
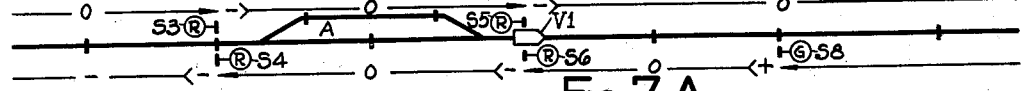
FIG.7.A.
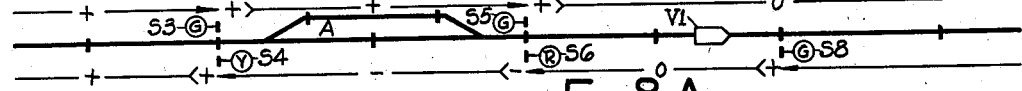
FIG.8.A.
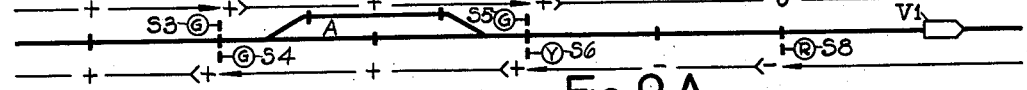
FIG.9.A.
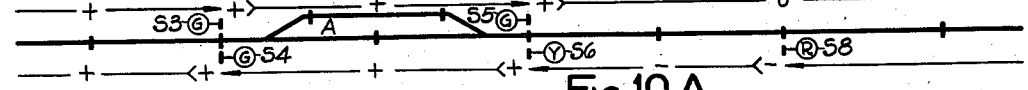
FIG.10.A.
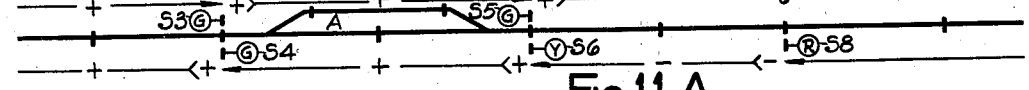
FIG.11.A.
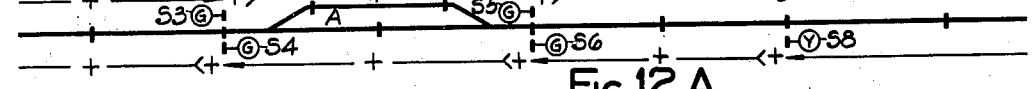
FIG.12.A.
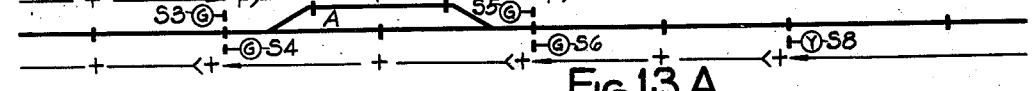
FIG.13.A.
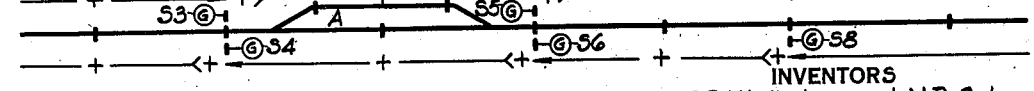
INVENTORS
O.B.Webster and N.B.Coley
BY  *Neil W. Alston*
THEIR ATTORNEY July 4, 1944.   O. B. WEBSTER ET AL   2,352,986
BLOCK SIGNALING SYSTEM FOR RAILROADS
Filed May 7, 1941   14 Sheets-Sheet 6
FIG.2.B.
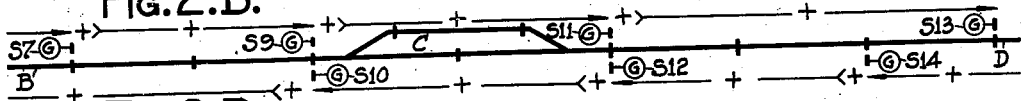
FIG.3.B.
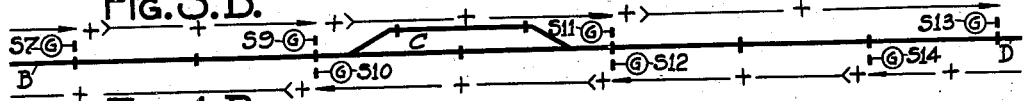
FIG.4.B.
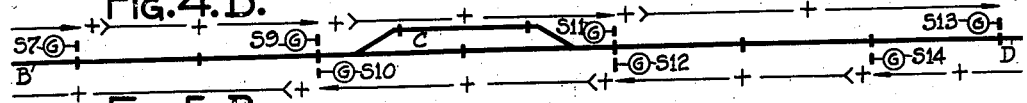
FIG.5.B.
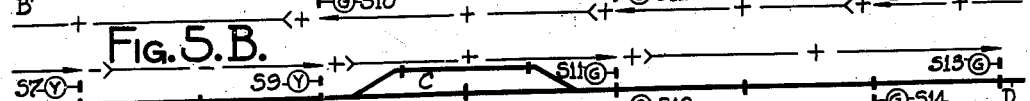
FIG.6.B.
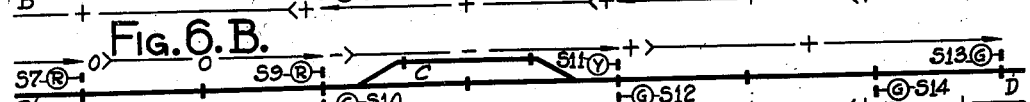
FIG.7.B.
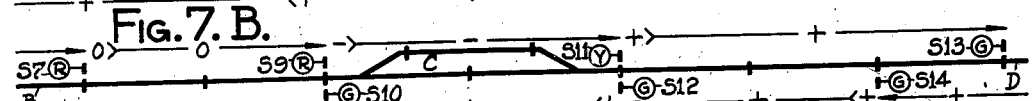
FIG.8.B.
FIG.9.B.
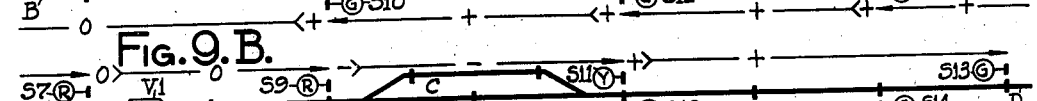
FIG.10.B.
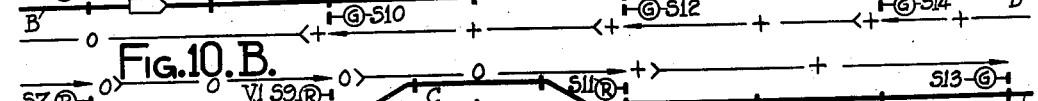
FIG.11.B.
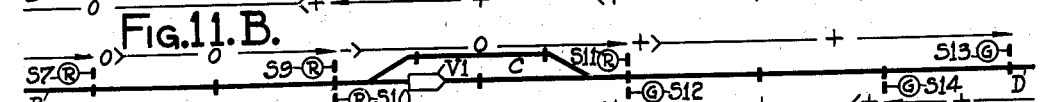
FIG.12.B.
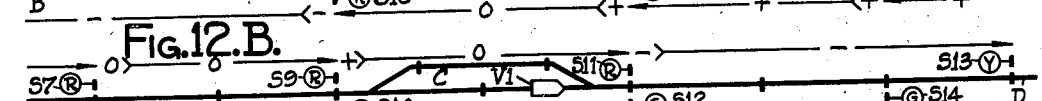
FIG.13.B.
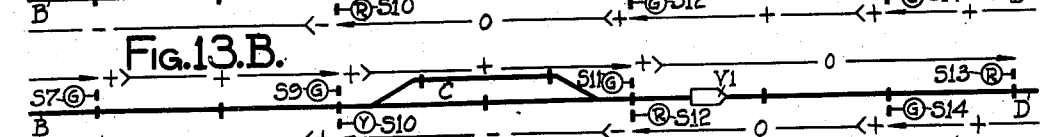
INVENTORS
O.B.Webster and N.B.Coley
BY Neil W. Preston
THEIR ATTORNEY July 4, 1944.   O. B. WEBSTER ET AL   2,352,986
BLOCK SIGNALING SYSTEM FOR RAILROADS
Filed May 7, 1941   14 Sheets-Sheet 7
FIG.14.A.
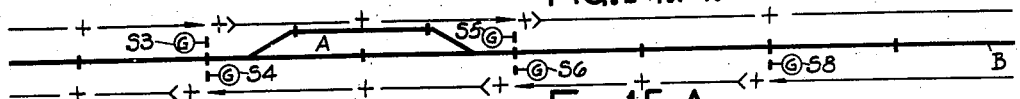
FIG.15.A.
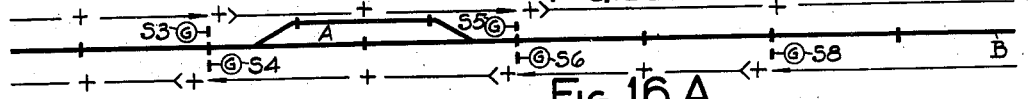
FIG.16.A.
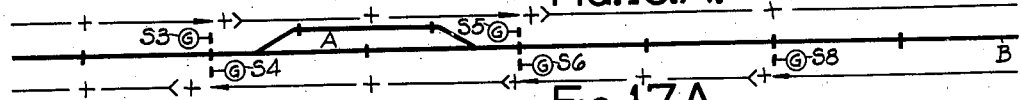
FIG.17.A.
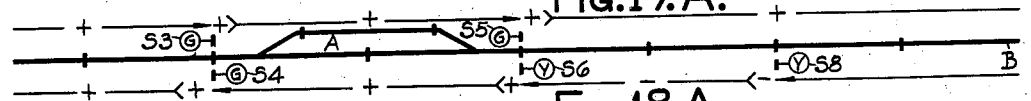
FIG.18.A.
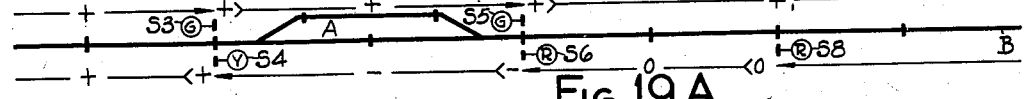
FIG.19.A.
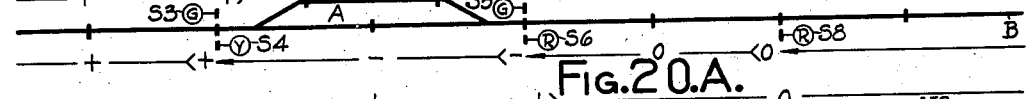
FIG.20.A.
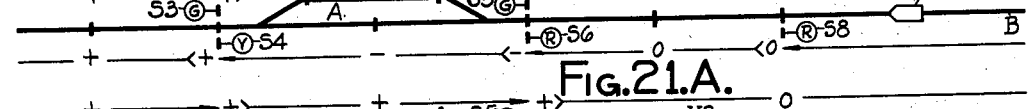
FIG.21.A.
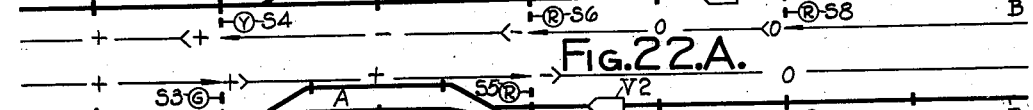
FIG.22.A.
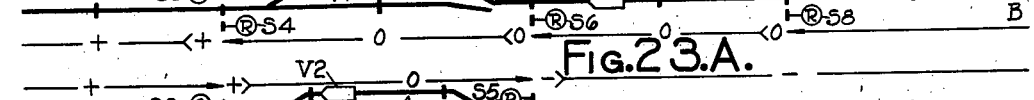
FIG.23.A.
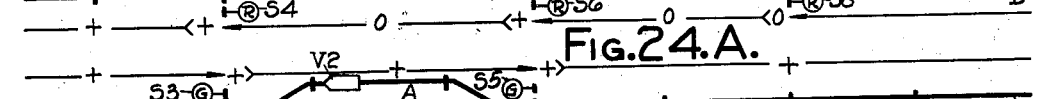
FIG.24.A.
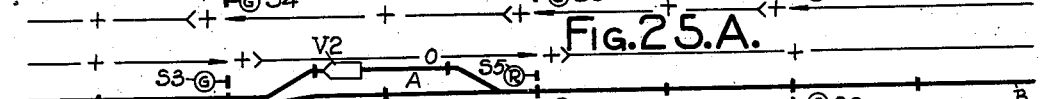
FIG.25.A.
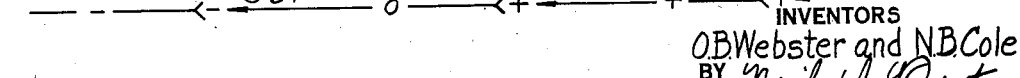
INVENTORS
O.B.Webster and N.B.Coley
BY Neil W. Preston
THEIR ATTORNEY July 4, 1944.  O. B. WEBSTER ET AL  2,352,986
BLOCK SIGNALING SYSTEM FOR RAILROADS
Filed May 7, 1941  14 Sheets-Sheet 8
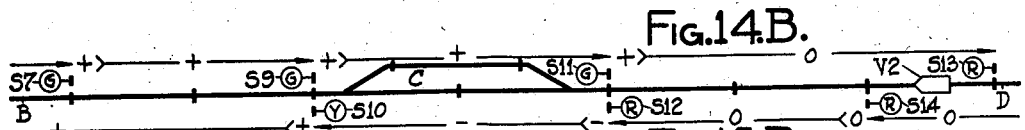
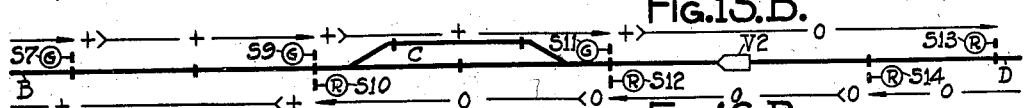
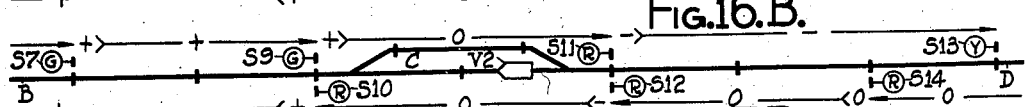
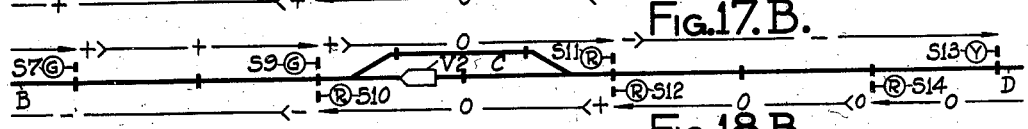
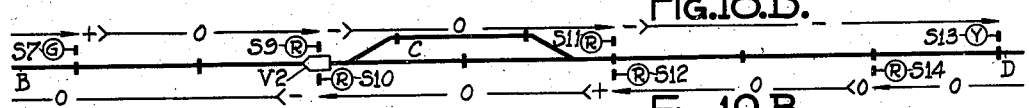
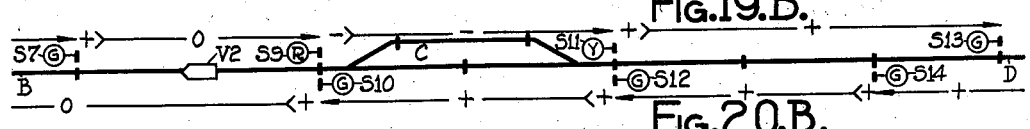
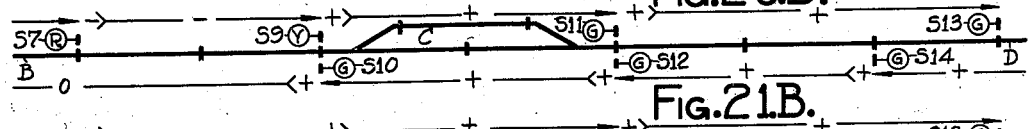
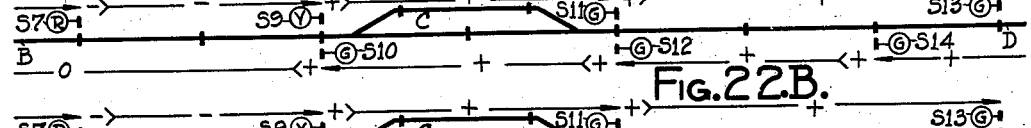
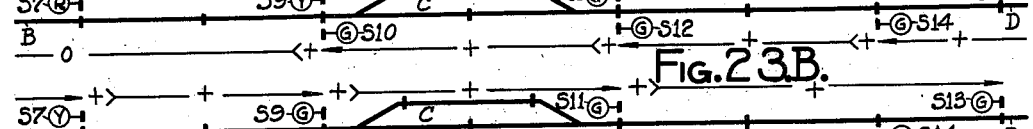
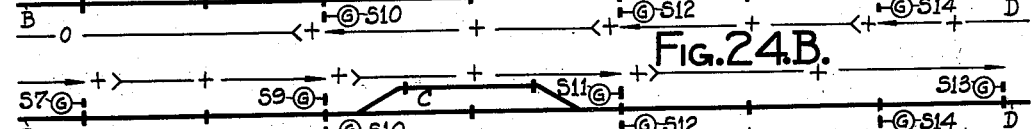
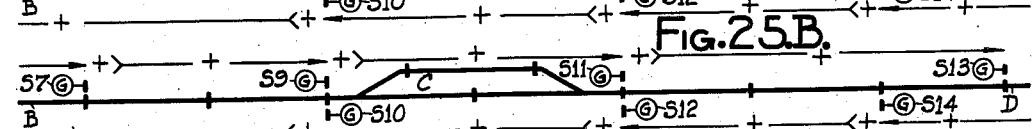
INVENTORS
O.B.Webster and N.B.Coley
BY
THEIR ATTORNEY July 4, 1944.    O. B. WEBSTER ET AL    2,352,986
BLOCK SIGNALING SYSTEM FOR RAILROADS
Filed May 7, 1941    14 Sheets-Sheet 9
FIG. 26.A.
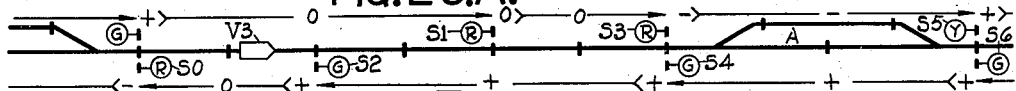
FIG. 27.A.
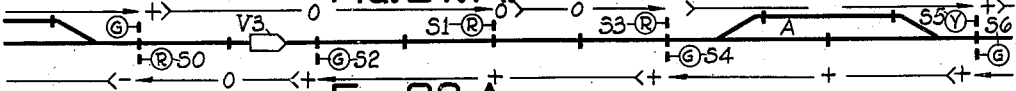
FIG. 28.A.
FIG. 29.A.
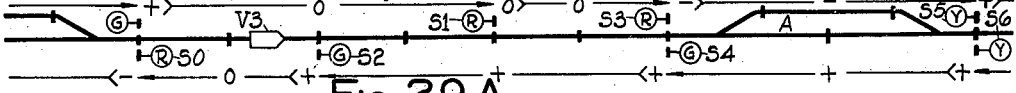
FIG. 30.A.
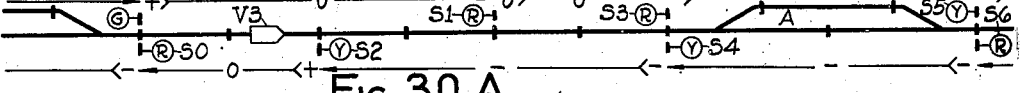
FIG. 31.A.
FIG. 32.A.
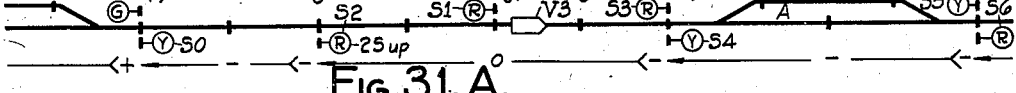
FIG. 33.A.
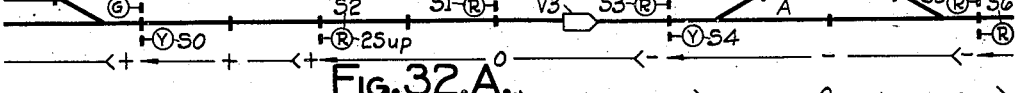
FIG. 34.A.
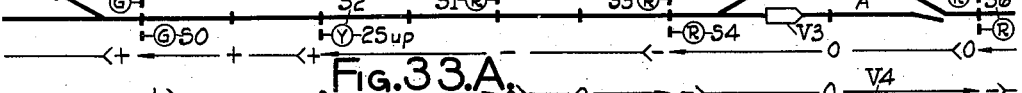
FIG. 35.A.
FIG. 36.A.
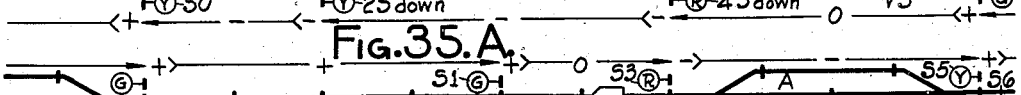
FIG. 37.A.
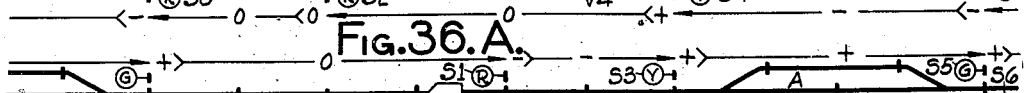
INVENTORS
O.B.Webster and N.B.Coley
BY Neil W. Preston
THEIR ATTORNEY July 4, 1944.  O. B. WEBSTER ET AL  2,352,986
BLOCK SIGNALING SYSTEM FOR RAILROADS
Filed May 7, 1941  14 Sheets-Sheet 10
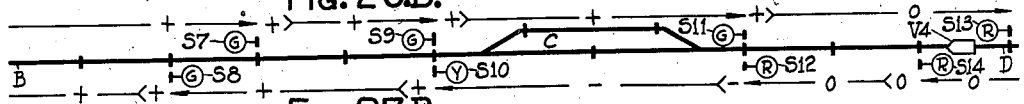
FIG. 26.B.
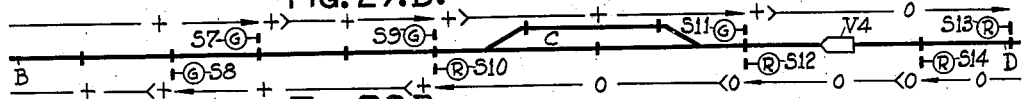
FIG. 27.B.
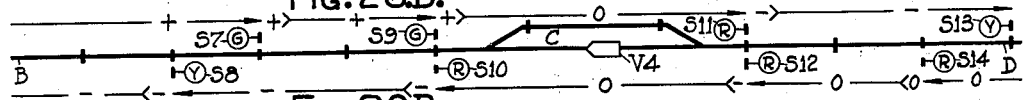
FIG. 28.B.
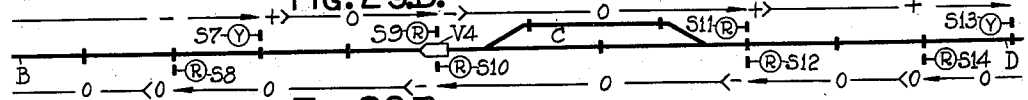
FIG. 29.B.
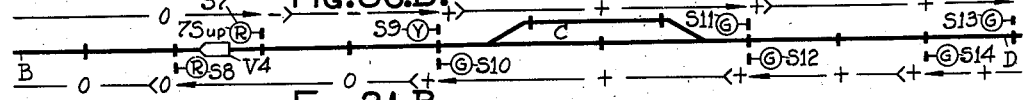
FIG. 30.B.
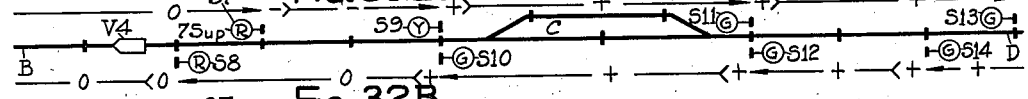
FIG. 31.B.
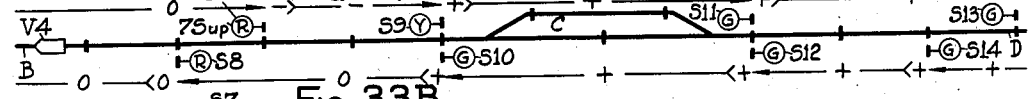
FIG. 32.B.
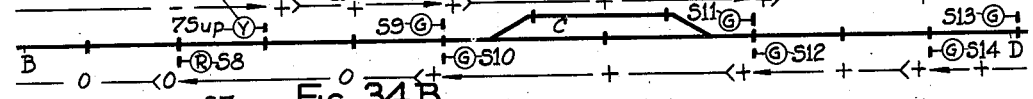
FIG. 33.B.
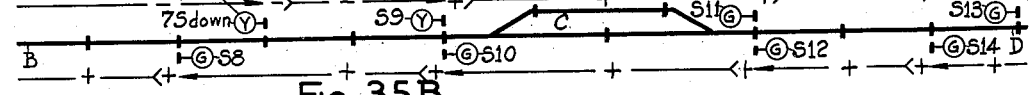
FIG. 34.B.
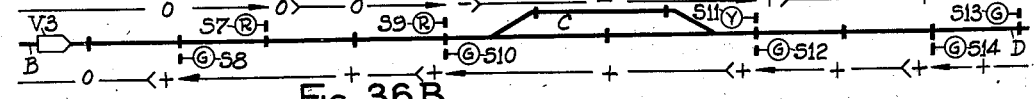
FIG. 35.B.
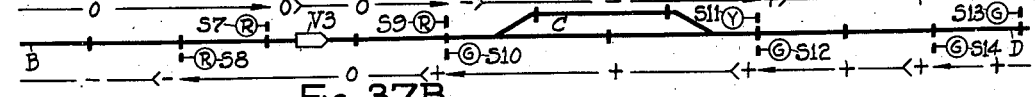
FIG. 36.B.
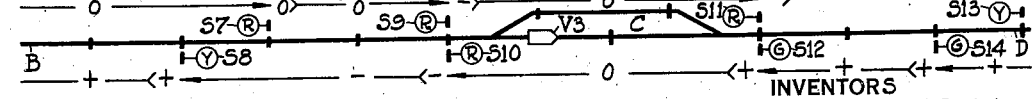
FIG. 37.B.
INVENTORS
O.B.Webster and N.B.Coley
BY Neil W. Preston
THEIR ATTORNEY

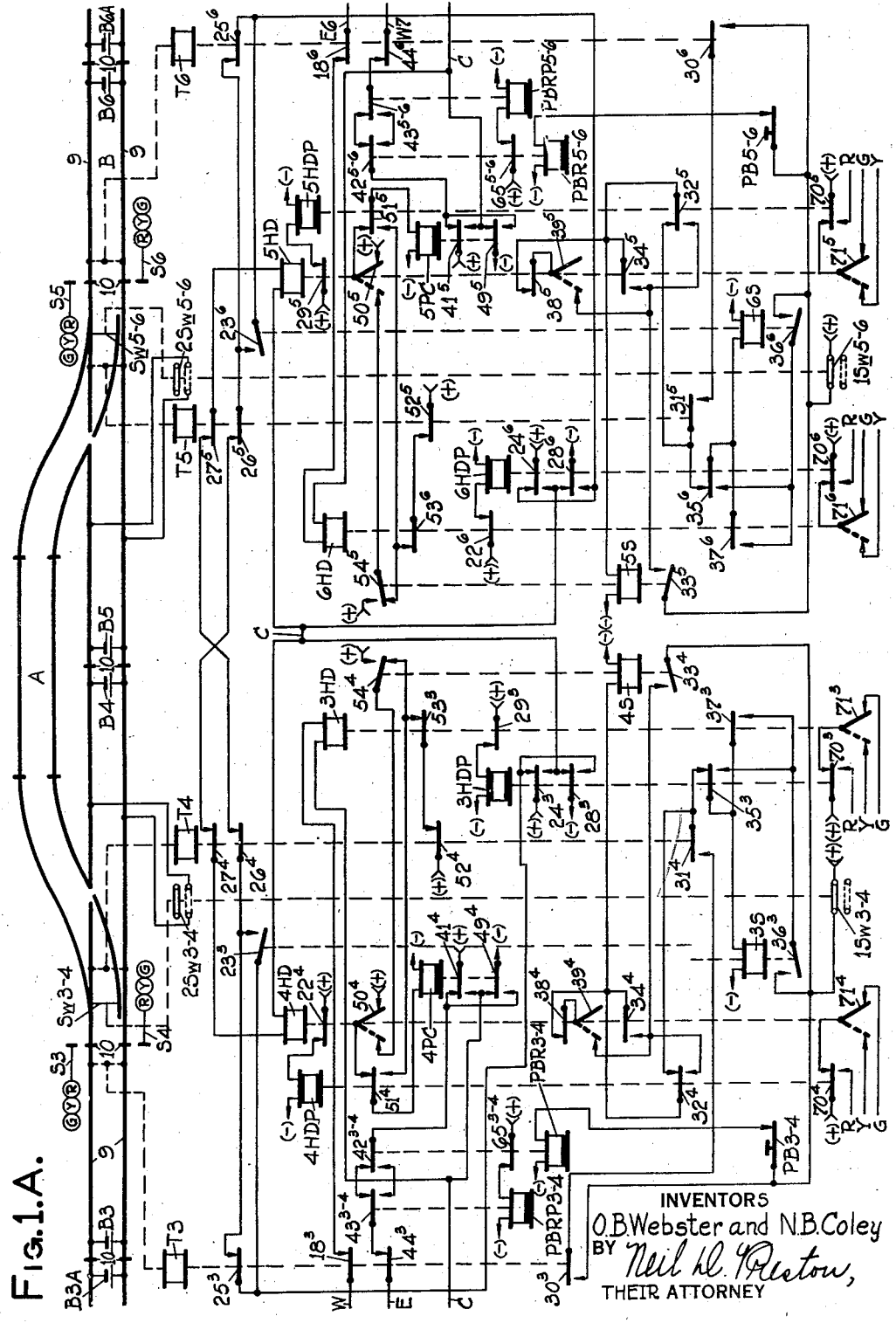

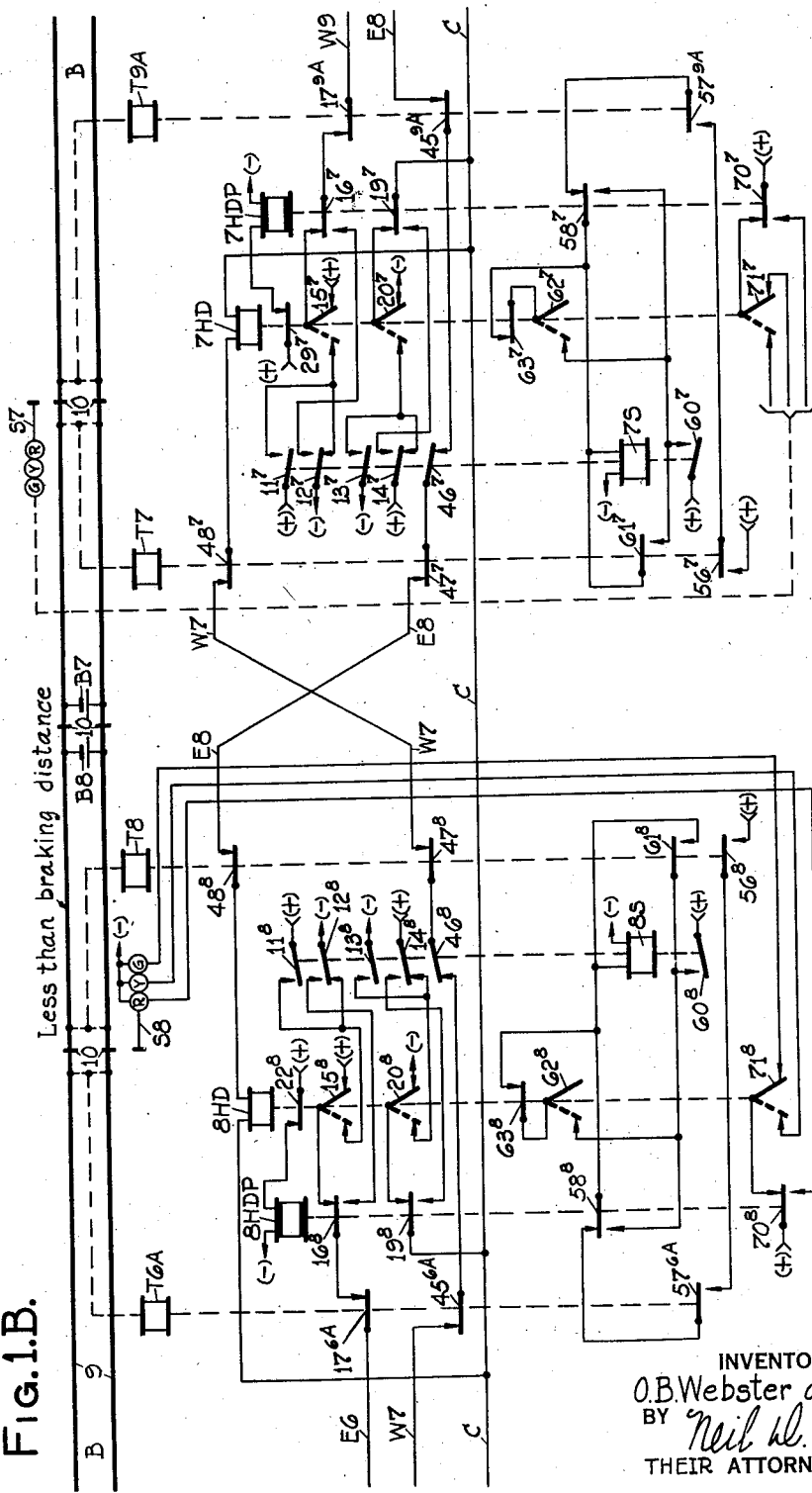

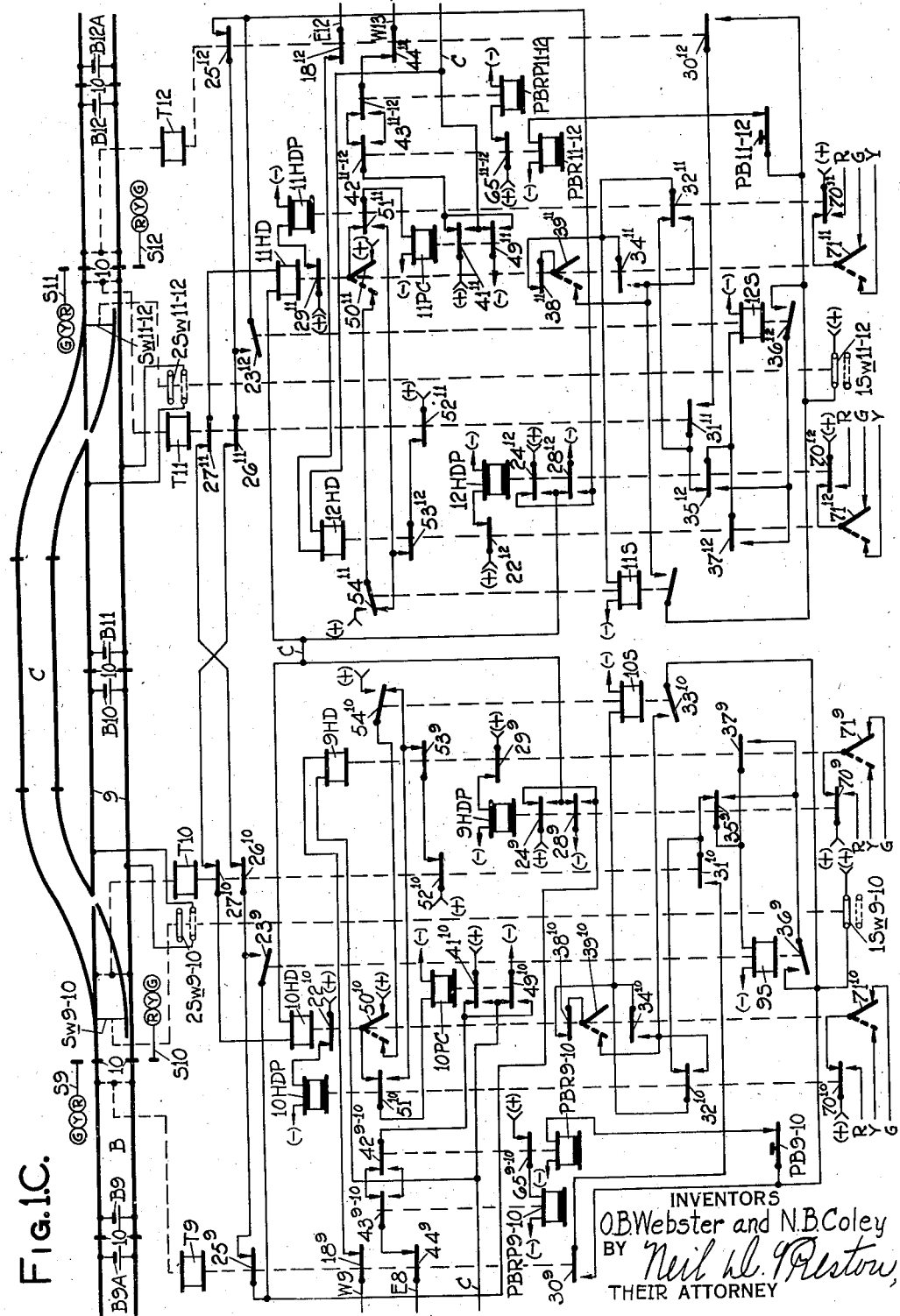

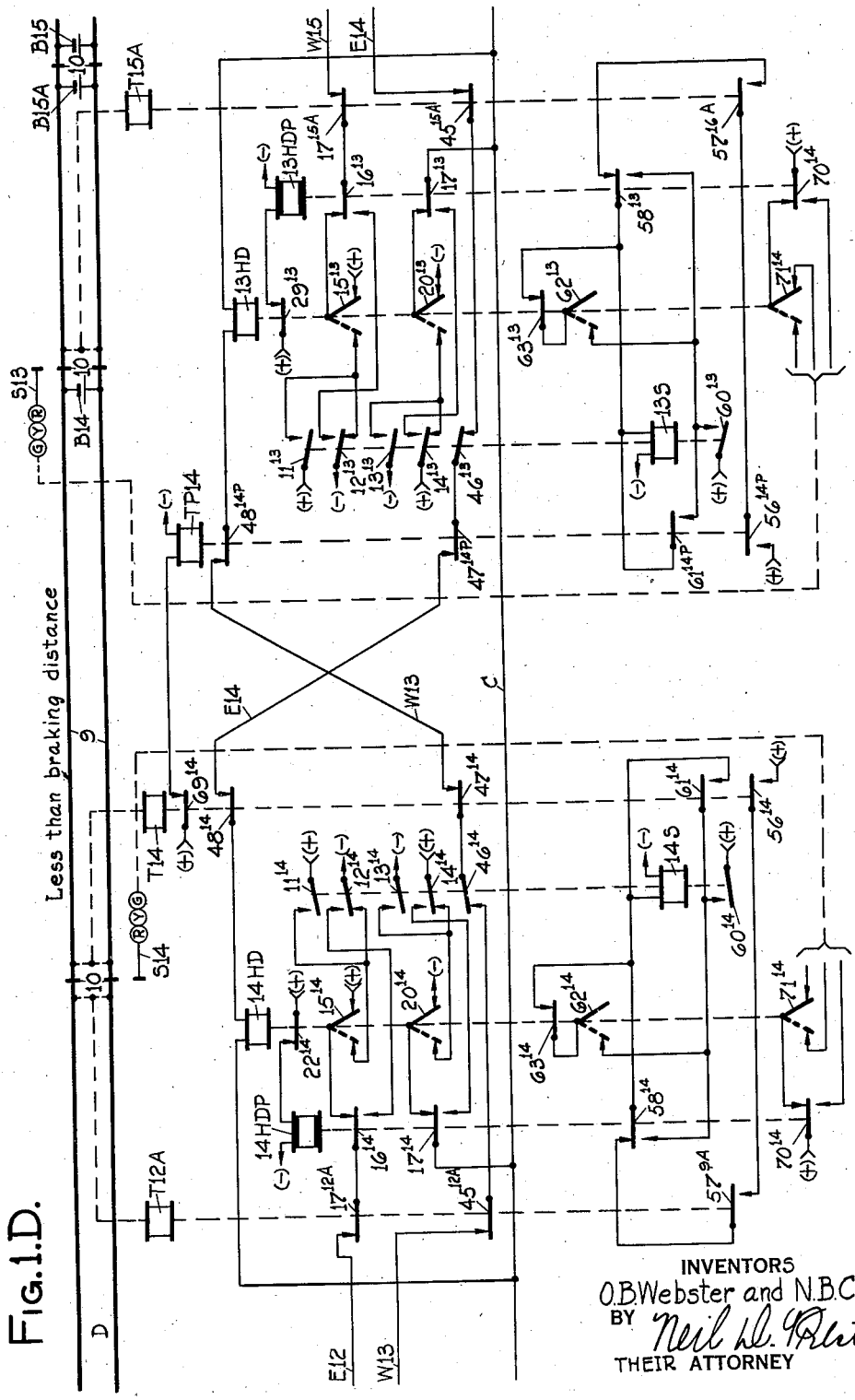

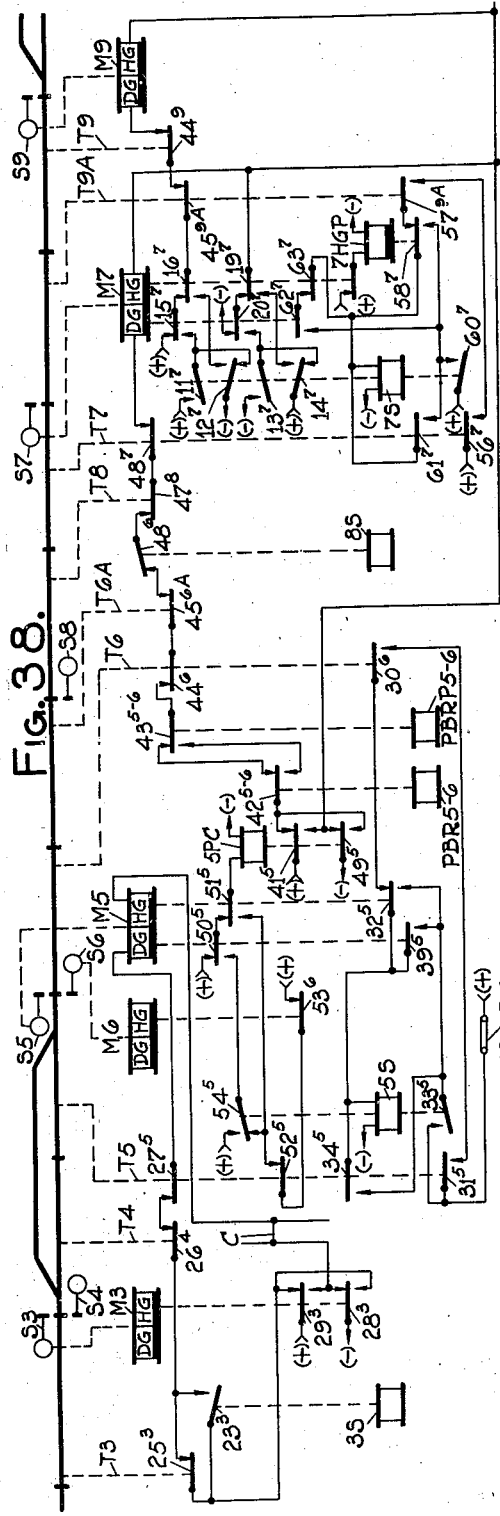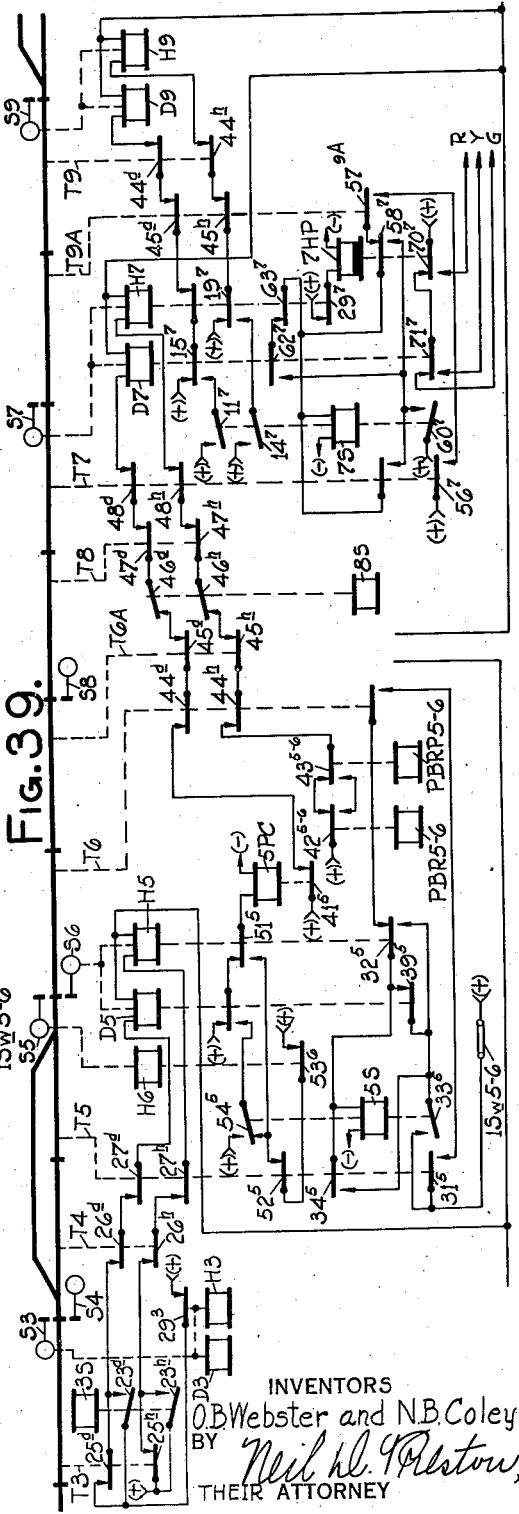

July 4, 1944.  O. B. WEBSTER ET AL  2,352,986
BLOCK SIGNALING SYSTEM FOR RAILROADS
Filed May 7, 1941   14 Sheets-Sheet 12

INVENTORS
O.B.Webster and N.B.Coley
BY
THEIR ATTORNEY

July 4, 1944.   O. B. WEBSTER ET AL   2,352,986
BLOCK SIGNALING SYSTEM FOR RAILROADS
Filed May 7, 1941   14 Sheets-Sheet 13
FIG.41.A.
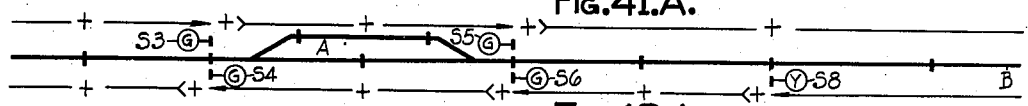
FIG.42.A.
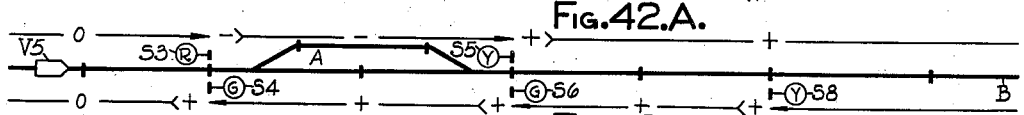
FIG.43.A.
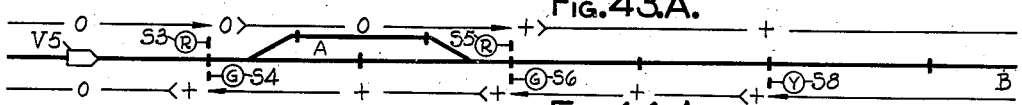
FIG.44.A.
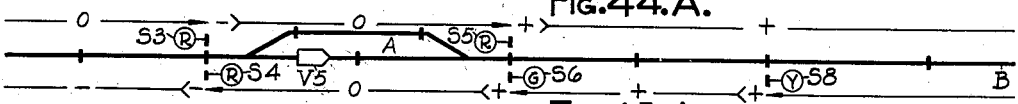
FIG.45.A.
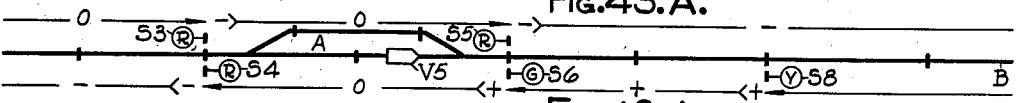
FIG.46.A.
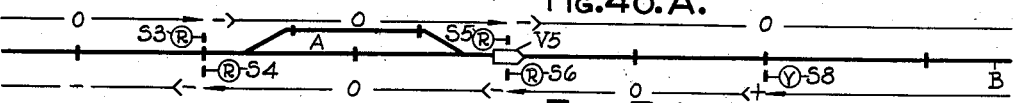
FIG.47.A.
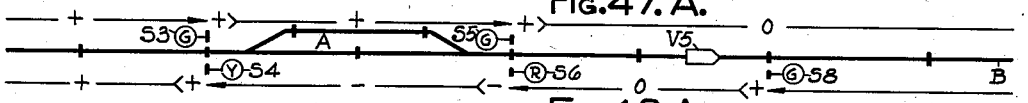
FIG.48.A.
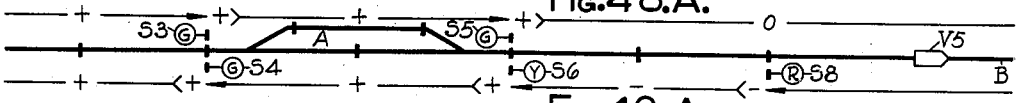
FIG.49.A.
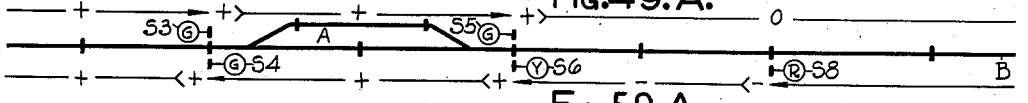
FIG.50.A.
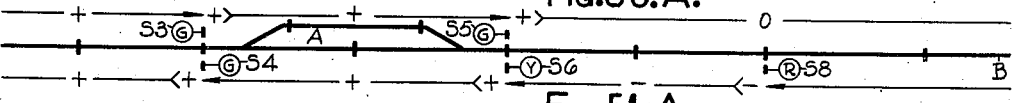
FIG.51.A.
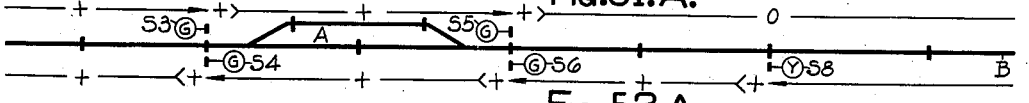
FIG.52.A.
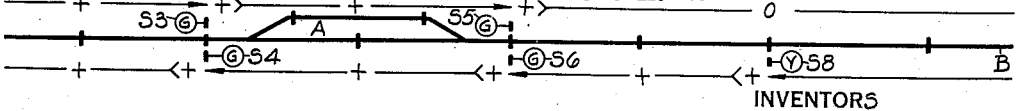
INVENTORS
O.B.Webster and N.B.Coley
BY
THEIR ATTORNEY July 4, 1944.   O. B. WEBSTER ET AL   2,352,986
BLOCK SIGNALING SYSTEM FOR RAILROADS
Filed May 7, 1941   14 Sheets-Sheet 14
FIG. 41.B.
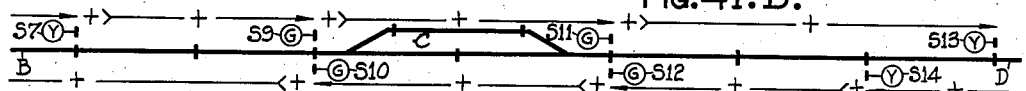
FIG. 42.B.
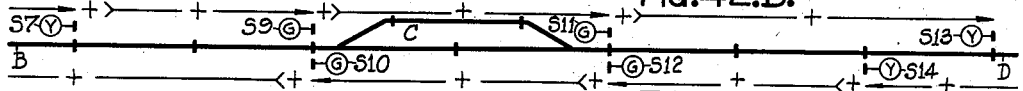
FIG. 43.B.
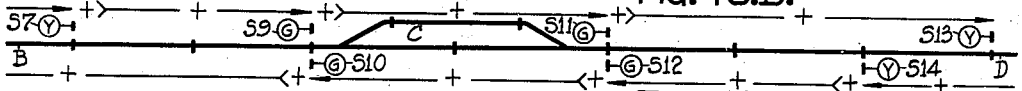
FIG. 44.B.
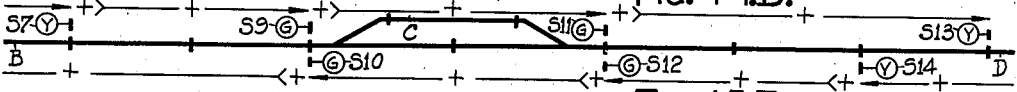
FIG. 45.B.
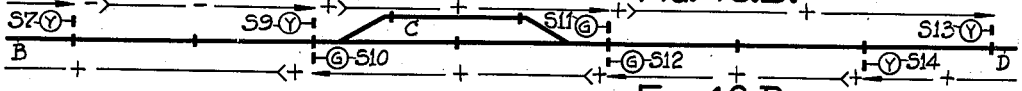
FIG. 46.B.
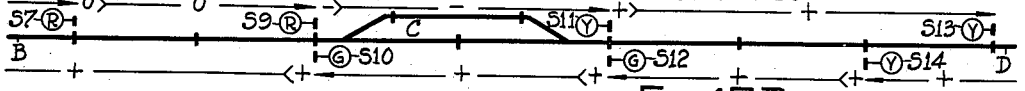
FIG. 47.B.
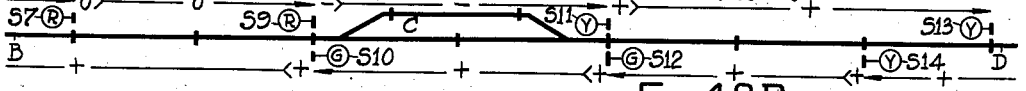
FIG. 48.B.
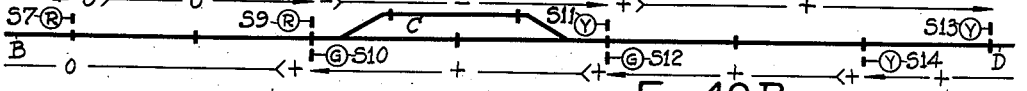
FIG. 49.B.
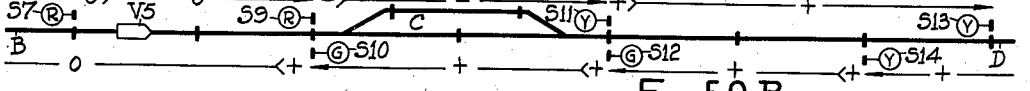
FIG. 50.B.
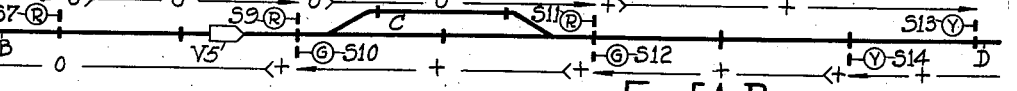
FIG. 51.B.
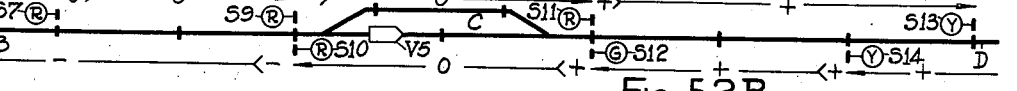
FIG. 52.B.
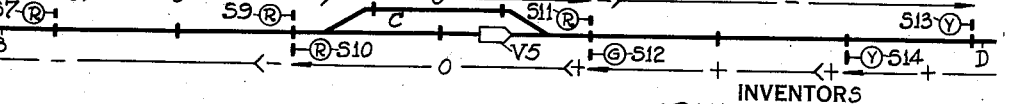
INVENTORS
O.B.Webster and N.B.Coley
BY Neil W. Preston
THEIR ATTORNEY Patented July 4, 1944

2,352,986

UNITED STATES PATENT OFFICE 2,352,986

BLOCK SIGNALING SYSTEM FOR RAILROADS

Osborne B. Webster and Nelson B. Coley, Rochester, N. Y., assignors to General Railway Signal Company, Rochester, N. Y.

Application May 7, 1941, Serial No. 392,298

36 Claims. (Cl. 246—33)

The present invention relates to railway signaling for single track railroads and more particularly to signaling of the absolute-permissive-block type.

Railway signaling of the absolute-permissive-block type employing track circuits and one line circuit for each direction of traffic, the two line circuits for opposite directions of traffic employing a common wire so that a total of three wires only were used, is well known to those skilled in the art of single track signaling. These absolute-permissive-block signaling systems earlier used and employing three line wires however required at least two intermediate signals, which were staggered to provide at least double braking distance therebetween. As the speeds of the trains have increased in recent years the signal spacing had to be changed, that is, increased in many instances, as a result of which less than double braking distance is available between staggered intermediate signals of many single track sections of single track railroads.

In view of the foregoing it is proposed in accordance with the present invention to provide a single track railway signaling system of the absolute-permissive-block type in which less than double or even single braking distance between a pair of staggered intermediate signals may be employed and at the same time afford absolute signaling protection against the movement of trains in opposite directions through the signal track section and to provide the facility of permissive signaling protection, that is, provide at least one danger signal followed by a caution signal to the rear of a train moving through the single track section of the railway system so that a second train may follow the first train with adequate signaling between the two trains. To accomplish these ends it is proposed in accordance with the present invention to provide a caution tumble-down signaling function, so to speak, when a train is a considerable distance to the rear of the entrance to a single track section and to provide the usual danger tumble-down signaling function upon the entrance of a train into the single track section. In order to accomplish these results one of the features provided in accordance with the present invention resides in the provision of a directional stick relay for each intermediate signal in a single track section, and for each entering signal governing entrance of traffic into the main track or side track of the passing siding, which directional stick relay when once picked up is held up until the associated signal is controlled to its clear indication condition.

Another object of the present invention resides in the provision of circuits and devices for causing the intermediate signals in two adjacent single track sections to indicate caution in response to the joint action of two opposing trains entering the distant ends of such two single track sections connected by a passing siding. In one form of the present invention separate home and distant relays controlled over individual line circuits, instead of polar-neutral devices each controlled over a polar line circuit, are employed.

Other objects, purposes, and characteristic features of the present invention will, to a large extent, be pointed out in detail in the following description and will in part be obvious from the accompanying drawings, in which:

Figs. 1A, 1B, 1C and 1D illustrate in detail the circuits of an absolute-permissive-block signaling system embodying the present invention, certain portions of this circuit diagram constituting modifications for other portions thereof;

Figs. 2A to 13A and 2B to 13B illustrate schematically the railway system shown in Figs. 1A-1B with an east-bound train assuming various positions on this system and in which the signals assume indicating conditions dependent on the presence of this east-bound train;

Figs. 14A to 25A and 14B to 25B illustrate the same railway track layout as illustrated in Figs. 2A-13B but illustrate signal indications in accordance with the position assumed by a west-bound train at various instances during its movement over the railway system illustrated;

Figs. 26A to 37A and Figs. 26B to 37B illustrate the same portion of the railway system as illustrated in Figs. 2A-13B and 14A-25B, except for the addition of a portion of another passing siding and an additional single track section including intermediate signals S0, S1 and S2, with the signals giving various signal indications dependent on the presence of an east-bound train and a west-bound train at various points along the track so chosen that these two trains make a meet at the passing siding A;

Fig. 38 shows a modified signaling system employing polar type search-light signals;

Fig. 39 shows a modified system employing two neutral circuits each including a neutral relay for each polar circuit including a polar-neutral relay employed in Figs 1A-1D.

Figure 40:
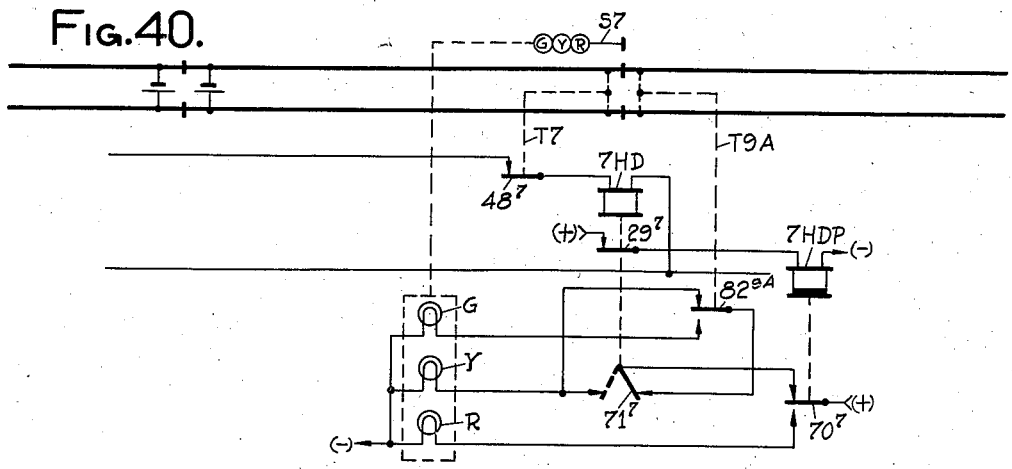

Fig. 40 shows a modified circuit construction for the intermediate signals.

Figure 53:
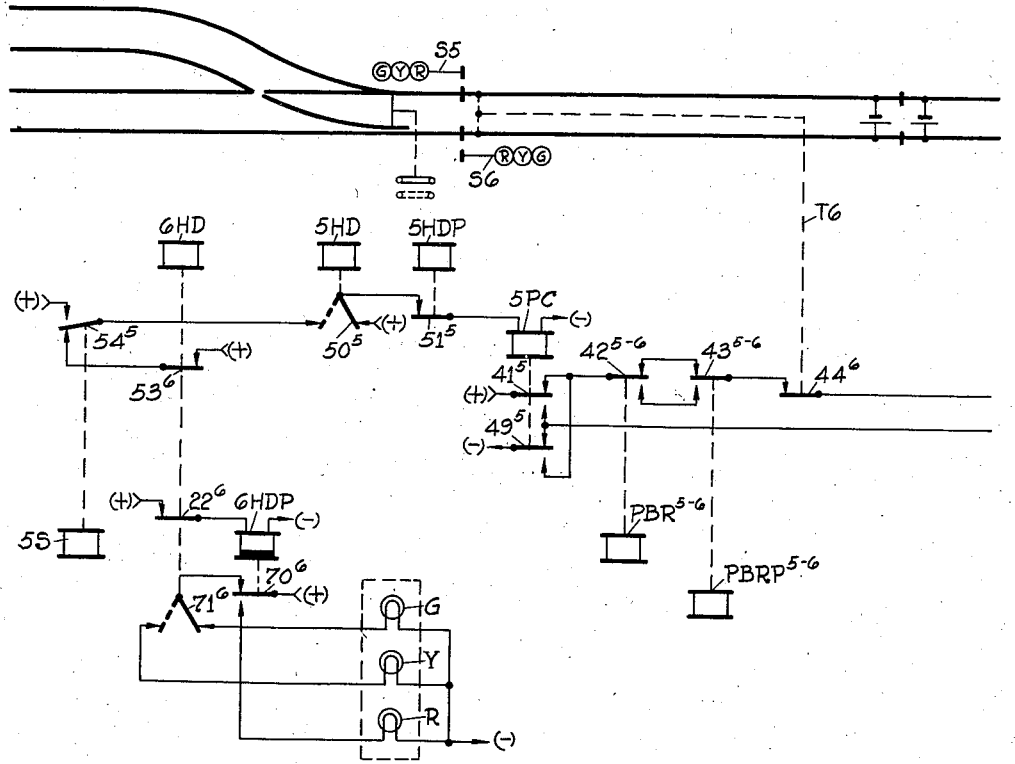

Figs. 41A to 52B show the signal aspects under various traffic conditions when the circuit construction of Fig. 40 is employed; and Fig. 53 shows a modified control for the intermediate signals to provide an overlap control for the caution tumble down feature.

STRUCTURE

Referring to Figs. 1A to 1D, inclusive, it will be seen that the passing sidings A and C have been illustrated connected by a single track section B and that an additional single track section D has been illustrated to the right of the passing siding C. This railway signaling system shown in Figs. 1A–1D includes track rails 9 divided by insulating joints 10 into track sections which are track circuited by track circuits including the usual track battery B and track relay T. In order to distinguish these various track batteries and track relays from each other each of these reference characters T and B is followed by a suffix number corresponding to the number of the track circuit, each track circuit being numbered in accordance with the signal that it most directly controls.

Each stretch of track extending from one signal to another governing traffic in the same direction is provided with a common wire C, an east-bound control line wire E, and a west-bound control line wire W. Each of the signals has been designated S with a suffix number to distinguish these signals from each other. These signals may be of any suitable construction, as for instance, semaphore signals, movable spectacle search-light signals, or multi-unit light signals, and for convenience multi-unit light signals having green (clear), yellow (caution), and red (danger) signal units designated G, Y and R, respectively, have been illustrated for the systems shown in Figs. 1A–1D and Fig. 39, search-light type signals having been shown in Fig. 38. For this reason the polar-neutral home-distant relay for each signal of Fig. 1 may be considered to be the electro-responsive means of the signal in the same way as though a search-light type signal had been specifically illustrated in Figs. 1A–1D.

Referring to Fig. 1A the head-block signal at the west end of the passing siding A has been designated S3 and the entering signal at that end has been designated S4. Similarly, the head-block signal at the east end of the passing siding A has been designated S6, whereas the associated entering signal has been designated S5. In a similar manner the head-block signal at the west end of the passing siding C has been designated S9 and its associated entering signal has been designated S10, whereas the head-block signal at the east end of the passing siding C has been designated S12 and its associated entering signal has been designated S11.

Referring now to the single track section B (see Fig. 1B of the drawings), the intermediate west-bound and east-bound signals thereof have been designated S7 and S8, respectively, whereas the corresponding intermediate signals for the single track section D (see Fig. 1D) have been designated S13 and S14, respectively. It is thus apparent that all of the east-bound signals have been designated S with a suffix of even number, whereas the west-bound signals have been designated S followed by an odd numbered suffix.

Referring now to the signal location having a pair of opposite signals S5 and S6 located at the east end of the passing siding A (see Fig. 1A), this signal location includes hole-distant polar-neutral relays 5HD and 6HD provided with repeater relays 5HDP and 6HDP, respectively, which home-distant relays each directly control the associated signal having a suffix number corresponding to the prefix number assigned to such relay. The manner in which these home-distant relays HD and their repeater relays HDP control their respective signals is indicated in detail for the signal S8 (see Fig. 1B of the drawings). The entering signal S5 has associated therewith a directional stick relay 5S and similarly the head-block signal S6 has associated therewith a directional stick relay 6S. The switch at the east end of the passing siding A has been designated Sw5—6 and it has associated therewith a push button PB5—6. This push button controls a push button relay PBR5—6 and a push button repeater relay PBRP5—6. The functions performed by this push button and its associated push button relays will be more specifically pointed out hereinafter. These track relays T, home-distant relays HD, home-distant repeater relays HDP, directional stick relays S, push button relays PBR, and push button repeater relays PBRP at other locations on the railway signaling system have been assigned like reference characters having distinctive prefixes or suffixes, as the case may be.

In order to obtain a more clear understanding of the circuits employed the circuits for the various relays associated with signals S5, S6 and S8 will be described in detail and thereafter like contacts of other circuits will be assigned corresponding reference characters having distinctive exponents. Referring to Figs. 1A and 1B of the drawings the home-distant relay 6HD is under normal clear traffic conditions energized through the following circuit: beginning at the terminal (+) of a suitable source of current, polar contact $15^8$ of the relay 8HD assuming its normal right-hand position, front contact $16^8$ of the home-distant repeater relay 8HDP, front contact $17^{6A}$ of the track relay T6A, line wire E6, front contact $18^6$ of the track relay T6, winding of the home-distant relay 6HD through the common return wire C, through front contact $19^8$ of the home-distant repeater relay 8HDP, through contact $20^8$ of the home-distant relay 8HD assuming its normal right-hand position, to the other terminal (—) of the same source of current. There are other energizing circuits for the home-distant relay 6HD which include contacts $11^8$, $12^8$, $13^8$ and $14^8$ of the directional stick relay 8S, but these additional circuits will be discussed in connection with the operation of the system hereinafter. The energizing circuit for the home-distant repeater relay 6HDP includes a front contact $22^6$ of the home-distant relay 6HD.

The home-distant relay 5HD is under normal clear traffic conditions energized through a circuit which may be traced as follows: beginning at the terminal (+) of a suitable source of current, front contact $24^3$ of the home-distant repeater relay 3HDP, front contact $25^3$ of the track relay T3, front contact $26^4$ of the track relay T4, front contact $27^5$ of the track relay T5, winding of the home-distant relay 5HD, through front contact $28^3$ of the home-distant repeater relay 3HDP to the other terminal (—) of the same source of current. When there is a west-bound train occupying the track section directly ahead of the signal S3 the home-distant relay 5HD is energized through a similar circuit including the front contact $23^3$ of the directional stick relay 3S instead of the front contact $25^3$ of the track relay T3. The home-distant repeater relay 5HDP is energized through a circuit including a front contact $29^5$ of the home-distant relay 5HD.

The directional stick relay 5S is provided with a pick-up circuit which may be traced as follows: beginning at the terminal (+) of a suitable source of current, track switch repeating contacts 1Sw5—6, back contact $30^6$ of the track relay T6, back contact $31^5$ of the track relay T5, front contact $32^5$ of the home-distant stick repeater relay 5HDP through the winding of the directional stick relay 5S and to the other terminal (—) of the same source. This stick relay 5S is also provided with three stick circuits as follows: (1) a stick circuit including switch repeating contact 1Sw5—6, stick contact $33^5$ of the stick relay 5S and back contact $32^5$ of the home-distant repeater relay 5HDP, (2) a stick circuit including the switch repeating contact 1Sw5—6, the stick contact $33^5$ of the relay 5S and the back contact $34^5$ of the home-distant relay 5HD, and (3) a stick circuit including the same switch repeating contact and stick contact and also including the front contact $38^5$ and the polar contact $39^5$ in its left-hand caution position of the home-distant relay 5HD. Similarly, the directional stick relay 6S is provided with a pick-up circuit including the switch repeating contact 1Sw5—6, back contacts $30^6$ and $31^5$ of the track relays T6 and T5, respectively, and front contact $35^6$ of the home-distant repeater relay 6HDP; and the two stick circuits for this directional stick relay 6S include: (1) the switch repeating contact 1Sw5—6, stick contact $36^6$ of the directional stick relay 6S, and back contact $35^6$ of the home-distant repeater relay 6HDP, and (2) switch repeating contact 1Sw5—6, stick contact $36^6$ of the directional stick relay 6S, and back contact $37^6$ of the home-distant relay 6HD.

Under normal clear traffic conditions the home-distant relay 8HD (see Fig. 1B) is energized through a circuit which may be traced as follows: beginning at the terminal (+) of a suitable source of current, front contact $41^{10}$ of the pole changer relay 10PC, front contact $42^{9-10}$ of the push button relay PBR9—10, front contact $43^{9-10}$ of the push button repeater relay PBRP9—10, front contact $44^9$ of the track relay T9, wire E8, front contact $45^{9A}$ of the track relay T9A, back contact $46^7$ of the directional stick relay 7S, front contact $47^7$ of the track relay T7, wire E8, front contact $48^8$ of the track relay T8, winding of the home-distant relay 8HD, to common return wire C, and through front contact $49^{10}$ of the pole changer relay 10PC, to the other terminal (—) of the same source of current. Upon movement of the pole changer relay 10PC to its retracted position the energizing circuit for this home-distant relay 8HD is exactly the same as just traced, except that the polarity of energization of the circuit has been reversed. This pole changer relay 10PC (see Fig. 1C) is under normal clear traffic conditions of the signaling system energized by a circuit beginning at the source (+), polar contact $50^{10}$ of the home-distant relay 10HD, assuming its right-hand clear position, front contact $51^{10}$ of the home-distant repeater relay 10HDP, through the winding of the pole-changer relay 10PC and to the terminal (—) of the same source. There are three additional circuits for the pole-changer relay; (1) through front contacts $52^{10}$ and $53^9$ of relays T10 and 9HD, respectively, and back contact $51^{10}$ of relay 10HDP; (2) through front contacts $52^{10}$ and $53^9$ of relays T10 and 9HD respectively, through back contact $54^{10}$ of directional stick relay 10S, through contact $50^{10}$ of relay 10HD assuming its left-hand caution position and front contact $51^{10}$ of relay 10HDP; and (3) a circuit through front contact $54^{10}$ of directional stick relay 10S, through polar contact $50^{10}$ assuming its left-hand position and front contact $51^{10}$ of relay 10HDP. These circuits will be more fully discussed hereinafter in connection with the operation of the system.

It is readily seen that the control circuits for stick relays 3S and 4S are respectively identical to the control circuits for the stick relays 6S and 5S and since the control circuits for these latter relays have already been traced the control circuits for the former relays need not be traced. It is also readily seen that the control circuits for stick relays 7S and 8S are identical and further are similar to the control circuits for stick relays 4S and 5S in that one stick circuit for each of stick relays 4S, 5S, 7S and 8S includes a caution contact of its associated home relay. For this reason the pick-up circuit and stick circuits for the directional stick relay 8S will be specifically described. This directional stick relay 8S is provided with a pick-up circuit including back contacts $56^8$ and $57^{6A}$ of the track relays T8 and T6A, respectively, and front contact $58^8$ of the home-distant repeater relay 8HDP. This directional stick relay includes three stick circuits which may be traced as follows: (1) the stick circuit including the stick contact $60^8$ of the stick relay 8S, and the back contact $58^8$ of the home-distant repeater relay 8HDP, (2) the stick circuit including the stick contact $60^8$ of the stick relay 8S and the back contact $61^8$ of the track relay T8, and (3) the stick circuit including the stick contact $60^8$ of the stick relay 8S, the polar contact $62^8$ of the home-distant relay 8HD assuming its left-hand caution position, and the front neutral contact $63^8$ of this same home-distant relay 8HD. The circuits for the directional stick relays associated with the remaining intermediate signals are identical and for this reason like contacts in their pick-up and stick circuits have been assigned like reference characters with distinctive exponents.

The push button relay PBR5—6 (Fig. 1A) is normally energized through a circuit including in series the switch repeating contact 1Sw5—6 and the normally closed contact of the push button PB5—6. The push button repeater relay PBRP5—6 is normally energized through the front contact $65^{5-6}$ of the push button relay PBR5—6. The track repeater relay TP14 is controlled through front contact $69^{14}$ of the track relay T14, so that these relays T14 and TP14 pick up and drop in substantial synchronism.

It will be observed that the detector track circuits associated with track switches Sw3—4, Sw5—6, Sw9—10 and Sw11—12 extend substantially half way through the main track of the passing sidings (see Figs. 1A and 1C). In order to prevent the clearing of an entering signal to a passing siding when one of these track switches is operated, each of these detector track circuits is provided with means to short-circuit the track rails thereof when the track switch is open. As illustrated this is accomplished by the track switch repeating contact 2Sw5—6 for the detector track circuit at the east end of the passing siding A, similar contacts being provided for the remaining detector track circuits. Not only will an open track switch put to stop the entering signal (such as signal S5) at that end of the passing siding, but it will also put the entering signal (such as signal S4) at the opposite end of the passing siding to stop by reason of the opening of the contact 26 of the associated detector track relay. As more clearly pointed out hereinafter the opening of a track switch will also cause a caution tumble down of signals through the adjacent single track stretch to occur. For reasons obvious from the drawings and pointed out hereinafter the signal (such as signal S7) next to the rear of an entering signal (such as signal S5) will at times be allowed to clear even though such entering signal is then at stop.

As heretofore pointed out certain portions of the system illustrated in Figs. 1A–1D constitute modifications of other and similar portions of the same system. For instance, instead of using what is known as a "cut section," meaning that a block is divided by insulating joints into two sections, each section of which is separately track circuited, such as is employed between the signals S7 and S8 (see Fig. 1B) it may be desirable to employ a single track circuit with the track relay repeated at the opposite end of the section through the medium of a track repeater relay. Such an arrangement is shown between the signals S13 and S14 in Fig. 1D of the drawings where the relay TP14 repeats the track relay T14.

Referring particularly to Figs. 1A and 1B of the drawings, attention is particularly directed to the energizing circuit for the home-distant relay 7HD, and particularly to the contacts which control the application of energy to the west end of this control circuit. It will be noted that under normal conditions this line circuit is energized through front pole-changer contacts 41⁵ and 49⁵ of the pole-changer relay 5PC. Also under such normal conditions this relay 5PC is energized over polar contact 50⁵ of the relay 5HD assuming its right-hand position and through front contact 51⁵ of the home-distant repeater relay 5HDP. It will also be seen that when the polar contact 50⁵ of relay 5HD is in its caution or left-hand position that energization of the pole-changer relay 5PC is then dependent on the position of contacts 52⁵, 53⁶ and 54⁵ of relays T5, 6HD and 5S respectively. It will also be noted that pole changing of this circuit for home-distant relay 7HD may be accomplished by these latter contacts 52⁵ and 53⁶ even though the home-distant repeater relay 5HDP is deenergized (its back contact 51⁵ closed). In other words, each of the contacts 51⁵, 52⁵, 53⁶ and 54⁵ at times cause pole changing of the line circuit for relay 7HD. It is also of interest and of considerable importance that deenergization of the home-distant relay 5HD and its repeater relay 5HDP will not cause pole changing of the energizing circuit for the home-distant relay 7HD so long as the track relay T5 and the home-distant relay 6HD are in their energized positions. In other words, if the signal S5 is put to stop by reason of the approach of an east-bound train in the single track section to the left of the passing siding A this fact will not cause the signal S7 to change from a clear to a caution indication as is usually the case. For reasons pointed out hereinafter this feature of applicant's system is perfectly safe because suitable approach control is provided to change the signal S7 from a clear signal to a caution signal if the signal S5 is at stop when a west-bound train approaches the signal S7 and in so doing will by the usual danger tumble-down function drop relay 6HD and open front contact 53⁶.

OPERATION OF THE SYSTEM

The operation of the system will be described under three sub-headings of "East-bound train movement," "a West-bound train movement," and "Two trains making a meet."

The operation of the signaling system illustrated in Figs. 1A to 1D, inclusive, will be discussed by making references to Figs. 2A–13B; Figs. 14A–25B, and Figs. 26A–37B of the drawings. It may be pointed out that if the sheet of the drawings containing Figs. 2A–13A, and the sheet of the drawings containing Figs. 2B–13B are laid side by side they will illustrate the signaling system shown in Figs. 1A–1D repeated twelve times, in each drawing of which the train or vehicle V1 assumes a different position on the railway system than in the preceding drawing. In a similar manner the sheets of the drawings containing Figs. 14A–25A and Figs. 14B–25B should also be laid side by side, as is also true of the sheets of the drawings which contain Figs. 26A–37A, and Figs. 26B–37B.

Referring now to Figs. 2A and 2B of the drawings it will be seen that arrows are shown pointing to the right, that is, toward the east, above the track diagram, and that arrows pointing to the left or west are shown below the track diagram. Each of these arrows is symbolic of a line feeding energy in the direction indicated by such arrow and is provided with a plus (+) sign, a minus (−) sign, or a zero (0) sign or symbol at the tail-end of the arrow. This convention illustrates the nature of the control applied to the line circuit at one signal for controlling the next signal in the rear, and the symbols (+), (−) or (0) shown near the middle of this arrow shows the nature of the control that is actually transmitted. For instance, referring to the arrow shown directly below the vehicle V1 in Fig. 2A of the drawings, it is apparent that (+) energy has been applied to the control circuit extending from the signal S4 to the signal next in the rear thereof, but that this control energy has been cut off by the opening of a front contact of the track relay due to the presence of the train in this section. Referring now to Figs. 9A and 9B of the drawings, it will be seen that (+) energy has been applied to the line circuit extending from the signal S5 to the signal S7 next in the rear thereof, as shown by the plus (+) applied to the tail-end of the arrow connecting these signals, but that this energy cannot flow as is manifested by the symbol zero (0) shown near the middle of this arrow, even though there is no train in this section. The current in the present instance is not permitted to flow through the control circuit extending to the signal S7 because the control circuit is open at the back contact 46⁸ of the directional stick relay 8S, because the vehicle V1 has just passed the signal S8 in an eastwardly direction and has picked up this relay 8S (see Figs. 9A and 1B of the drawings). In other words, each of the arrows shown in Figs. 2A and 37B of the drawings conventionally represents a line circuit shown somewhere in Figs. 1A to 1D of the drawings, and the plus (+), minus (−), or zero (0) signs illustrated at the tail end of such arrow shows the nature of the control applied to the line circuit, and the plus (+), minus (−), or zero (0) symbol near the middle of such arrow indicates the actual current, if any, that is flowing in this line circuit. Also, the letters G, Y or R applied to each of the signals shown in Figs. 2A to 37B, inclusive, signifies the indication given by such signal under the traffic conditions then existing.

East-bound train movement

Referring to Figs. 2A to 13B, inclusive, it will be seen that the east-bound train or railway vehicle V1 has been shown at various locations along the track to signify successive positions of this train during its progress in an easterly direction over the signaling system illustrated in Figs. 1A to 1D, inclusive. With the railway vehicle V1 located as illustrated in Fig. 2A the signal S3 assumes the stop position and the signal S5 assumes the caution position. Referring to Fig. 1A it will be seen that the presence of the train on the track circuit containing the track battery B3A will cause deenergization of the home-distant relay 3HD (see control circuit for relay 9HD, Fig. 1C), thereby putting the signal S3 to stop because the opening of the front contact 29³ of home-distant relay 3HD deenergizes the repeater relay 3HDP, thereby opening the front contact 70³ included in series in the energizing circuit for the green lamp of the signal S3, and causing the back contact 70³ to close an energizing circuit for the red lamp of this signal S3, the polar contact 71³ of the home-distant relay 3HD remaining in its right-hand position. Also, dropping of the home-distant repeater relay 3HDP by the dropping of its pole changer contacts 24³ and 28³ causes the home-distant relay 5HD to be energized by current of reverse polarity, thereby operating the polar contact 71⁵ to the reverse position to close the energizing circuit for the caution or yellow lamp Y of the signal S5 and opening of the circuit for the green or clear lamp G of this signal S5. The next opposing signal in advance of the train V1 therefore gives a danger indication, whereas the second opposing signal S5 in advance of the train gives a caution indication as diagrammatically illustrated by the letters "R" and "Y" on the signals S3 and S5, respectively, of Fig. 2A of the drawings.

Let us now assume that the railway vehicle V1 in question advances to the position illustrated in Fig. 3A of the drawings to thereby cause deenergization of the track relay T3 (see Fig. 1A). Dropping of the track relay T3, among other things, causes the opening of its front contact 25³ included in series in the energizing circuit for the home-distant relay 5HD, thereby deenergizing this relay 5HD. Dropping of the relay 5HD places the signal S5 in its stop condition as shown by the letter "R" in Fig. 3A, and by the opening of its front contact 29⁵ deenergizes the home-distant repeater relay 5HDP. The dropping of this repeater relay 5HDP causes dropping of its contact 51⁵. Since, however, the contacts 52⁵ and 53⁶ of relays T5 and 6HD, respectively, are now in their normal raised position no pole changing of the energizing circuit for the home-distant relay 7HD takes place and the signal S7 remains in its clear indicating condition. The conditions of these various line circuits under the two traffic conditions is conventionally shown by the corresponding arrows in Figs. 3A and 3B of the drawings.

Referring again to Fig. 3A of the drawings, it will be seen that the railway vehicle V1 has two opposing stop signals S3 and S5 directly ahead of the train, and has a clear signal S7 to the rear of the signal S5 at stop. These signals are, however, opposing signals and do not in any way restrict the movement of the vehicle V1. Even though there is a clear signal S7 directly in the rear of the stop signal S5 this does not mean that there is inadequate safety, because if a west bound train were to enter the single track stretch B the signal S7 would be operated to the caution position for the same reason that signal S2 (Fig. 29A) is operated to caution by the entrance of west bound train into single track stretch B (Fig. 29B) as more particularly pointed out hereinafter.

Let us now assume that the train V1 accepts and passes the clear signal S4 and assumes the position illustrated in Fig. 4A of the drawings. This does not affect any of the opposing signals in advance of the train, but it does change the signal S4 from a clear signal to a stop signal, as is evident from the letters "G" and "R" appearing on these signals in Figs. 3A and 4A, respectively. The movement of this train V1 by the signal S4, however, controls signals in the rear thereof, in part by the energization of the directional stick relay 4S. For this reason attention is directed to Fig. 1A of the drawings from which it is apparent that as the front end of train V1 under consideration passes the signal S4 it will hold both of the track relays T3 and T4 in their deenergized position, and with these track relays T3 and T4 in their retracted position, and with the home-distant repeater relay 4HDP not yet having responded to the dropping of the home-distant relay 4HD so that its front contact 32⁴ is still closed, a pick-up circuit for the directional stick relay 4S, including the back contact 30³, the back contact 31⁴, and the front contact 32⁴ of the relays T3, T4 and 4HDP in series, is closed. With this directional stick relay 4S once picked up it will remain energized through one or the other of three stick circuits so long as either the home-distant relay 4HD or the home-distant repeater relay 4HDP remain in their deenergized position, or the home-distant relay 4HD remains in its caution position. With the directional stick relay 4S now energized current may flow (see contact 54⁴) to the pole changer relay 4PC to in turn cause current of normal polarity to flow to the home-distant relay 2HD (not shown) next in the rear of the signal S4 only if the polar contact 50⁴ of the home-distant relay 4HD is in its caution position (see similar circuit for relay 8HD in Figs. 1B and 1C of the drawings). The purpose and function of these contacts 50⁴ and 54⁴ will become more apparent when corresponding contacts included in the energizing circuit for the pole-changer relay 5PC is considered hereinafter. It should, however, be observed that home-distant relay 3HD is held down because of the energized stick relay 2S (not shown but see relay 8S) associated with the signal to the rear of signal S4, and that this stick relay 2S will be released by clearing of its associated signal S2 as soon as the associated home-distant relay returns to its right-hand clear position.

Referring now to Fig. 5A of the drawings it will be seen that the vehicle V1 has advanced beyond the limits of the detector track circuit associated with the west half of the siding A and is now occupying the detector track circuit associated with the east half of the passing siding A. This produces a very important effect upon the signaling apparatus in that it operates the signals S7 and S9 to the caution condition, which may for convenience be called the performance of the caution tumble-down function. Referring to Fig. 1A it will be seen that the presence of the east-bound train on the right-hand half of the main track of passing siding A shunts and deenergizes the track relay T5, thereby causing the dropping of contact $52^5$ of this relay T5. Since the home-distant repeater relay 5HDP had already assumed its deenergized position the dropping of this contact $52^5$ of relay T5 causes dropping of relay 5PC and pole-changing of the circuit for home-distant relay 7HD and the operation of the signal S7 to the caution position. This new circuit for relay 7HD may be traced through line wire E8 from a terminal minus (—), back contact $49^5$ of relay 5PC, front contacts $42^{5-6}$, $43^{5-6}$, $44^6$ and $45^{6A}$ of relays PBR5—6, PBRP5—6, T6 and T6A respectively, back contact $46^8$ of directional stick relay 8S, front contacts $47^8$ and $48^7$ of relays T8 and T7, respectively, winding of relay 7HD, through the common return wire C and through back contact $41^5$ of relay 5PC, to the other terminal plus (+) of the same source of current. The operation of contacts $15^7$ and $20^7$ of relay 7HD to their left-hand position (relay 7S down) will of course cause pole changing of the energizing circuit for the home-distant relay 9HD and operation of this relay 9HD and signal S9 to their caution condition. This caution tumble-down function thus causes all of the opposing signals in the single track stretch B next in advance of the east bound train V1 to assume a caution, or a still more restricted, signal aspect, as shown in Fig. 5B of the drawings.

Let us now assume that the train advances from the position it occupies in Fig. 5A of the drawings to the position it occupies in Fig. 6A of the drawings. Since the rear end of the train has not yet fully left the passing siding A all of the signal apparatus to the rear of the train will remain in the same condition as in Fig. 5A of the drawings. The train V1 has however accepted the clear signal S6 by passing it and has changed it to a stop signal as shown in Fig. 6A of the drawings. The entrance of the front wheels and axles of the vehicle V1 upon the track circuit containing track relay T6 causes deenergization of this track relay T6 and the opening of its front contact $44^6$ (see Fig. 1A) included in the energizing circuit for the home-distant relay 7HD (see Fig. 1B), to cause a danger tumble-down of signals, so to speak, through the single track section illustrated in Fig. 1B. This danger tumble-down of signals is continued through the medium of deenergization of the home-distant repeater relay 7HDP in response to dropping of the home-distant relay 7HD and by opening of front contacts $16^7$ and $19^7$ of this relay 7HDP. It will, of course, be understood that the directional stick relay 7S still assumes its normal retracted position and it is readily evident from the circuit including back contacts $16^7$ and $19^7$ of relay 7HDP that this circuit is open at front contacts $12^7$ and $14^7$ of the directional stick relay 7S, as a result of which the home-distant relay 9HD (see Fig. 1C) is deenergized. This dropping of the home-distant relays 7HD and 9HD and in turn their repeater relays 7HDP and 9HDP will, of course, put both of the signals S7 and S9 in their stop, danger or R position, as illustrated in Fig. 6B of the drawings. For reasons heretofore given, it is readily seen that dropping of the home-distant repeater relay 9HDP will, by the operation of its pole changer contacts $24^9$ and $28^9$, cause the home-distant relay 11HD to be energized by current of reverse polarity and be operated to its reverse position, as a result of which the signal S11 is actuated to its caution or Y condition as illustrated in Fig. 6B of the drawings. Referring to Figs. 6A and 6B it will be seen by the arrows indicating the conditions of the line circuits that the signal S5 energizes the line circuit extending to the signal S7 by current of negative polarity as indicated by the minus (—) sign at the tail end of the arrow extending from signal S5 to signal S7, but that this current of negative polarity cannot flow is manifested by the zero (0) sign near the middle of this arrow. It will also be seen by the arrow extending from signal S7 to signal S9 (see Fig. 6B) that the apparatus at signal location S7 applies zero potential and that, therefore, no current flows in the line circuit extending to the signal S9. It is also evident that the signal S9 applies current of negative polarity to the line circuit extending to the signal S11 as is manifested by the minus (—) sign at the tail end of the arrow extending from signal S9 to signal S11, and that in this instance current of negative polarity actually flows as is indicated by the minus (—) sign at the middle of this same arrow. Similarly, the arrow extending from the signal S11 to the signal S13 has current of positive polarity applied thereto at the signal location of the signal S11 and that this current of positive polarity actually flows as is indicated by the plus (+) sign indicated near the middle of this same arrow. Attention is also directed to the fact that dropping of the track relay T6 by entrance of the train V1 into the single track section B (shown in Fig. 1A) that the stick relay 6S was picked up through back contacts $36^6$ and $31^5$ and front contact $35^6$ of relay 6HDP before this latter relay dropped and that two stick circuits for this relay 6S were then closed.

Let us now assume that the train V1 moves from the position illustrated in Fig. 6A to the position illustrated in Fig. 7A. This change in the position of the train V1 does not change any signal indication in advance of the train. To the rear of the train signal indications have however been changed since the train V1 vacated the main track of the passing siding A. The picking up of track relay T5 allows the current of negative polarity, which is indicated by the minus (—) sign at the tail end of the arrow extending from signal S6 to the signal S4, to flow. This current flows through the winding of relay 4HD and through back contacts $24^6$ and $28^6$ of the home-distant repeater relay 6HDP (see Fig. 1A). It should be noted that this current flowed through front contact $23^6$ of the directional stick relay 6S so long as the train V1 still shunted the track relay T6. This current causes the signal S4 to the rear thereof to indicate caution as is evident from the letter "Y" shown on the signal S4 in Fig. 7A. It will also be observed that the signal S3 has been changed from its danger or R indication to its clear or G indication. This is caused by the dropping of the stick relay 2S (not shown) at the signal location of signal S2 (shown in Fig. 27A) to the rear of the signal S4. This phase of the operation of the system will be brought out more clearly when the position of the train, as shown in Fig. 13B, is considered.

As the train V1 now advances from the position shown in Fig. 7A, to the position shown in Fig. 8A, no change in the signal aspects ahead of the train takes place. This forward movement of the train V1 however places the signal S8 in its stop position because its presence on the track circuit containing track relay T8 causes deenergization of the home-distant relay 8HD by opening of front contact 48⁸ of track relay T8. Also, this movement of the train by the signal S8 causes the directional stick relay 8S to be picked up and stuck up and causes its front contacts 12⁸ and 14⁸ in cooperation with back contacts 16⁸ and 19⁸ of the home-distant repeater relay 8HDP to apply current of negative polarity to the line circuit for the home-distant relay 6HD. This is indicated by the minus (—) sign at the right-hand or tail-end of the arrow extending from the signal S8 to the signal S6 (see Fig. 8A). Since there is nothing to prevent the flow of this current of negative polarity (see minus (—) sign near middle of same arrow) the signal S6 will indicate caution and will in turn apply current of positive polarity to the line circuit for the home-distant relay 4HD. This current flowing through front contacts 24⁶ and 28⁶ of of the home-distant repeater relay 6HDP is of normal polarity as indicated by the plus (+) signs at both the tail-end and at the middle of the arrow extending from the signal S6 to the signal S4. This will cause the signal S4 to again clear due to return of relay 4HD to its normal right-hand position which also drops the directional stick relay 4S by the opening of contact 39⁴ of relay 4HD included in the only remaining stick circuit for relay 4S.

As the train V1 under consideration now advances from the position illustrated in Fig. 8A to the position illustrated in Fig. 9B of the drawings, no change in any signal aspects takes place as is evident from the signals illustrated in Figs. 8A, 8B, 9A and 9B. An important fact should, however, be observed. It will be seen that as shown in Figs. 8A and 8B the presence of the train V1 held open the line circuit for controlling signal S7 by reason of open front contacts 47⁸ and 48⁷ of track relays T8 and T7 and that this is not the case under Fig. 9B traffic conditions. Under Fig. 9B traffic condition this circuit is held open by open back contact 46⁸ of directional stick relay 8S.

Let us now assume that the train V1 advances by the insulating joints 10 separating the batteries B9 and B9A (see Fig. 1C) to the position shown in Fig. 10B. The movement of the train by these insulating joints causes the track relay T9 to be deenergized, thereby opening its front contact 25⁹ included in the energizing circuit for the home-distant relay 11HD. This is indicated by the zero (0) shown at the tail-end of the arrow extending from the signal S9 to the signal S11 in Fig. 10B of the drawings. This, of course, results in the flow of no current as indicated by the zero (0) near the middle of this same arrow and causes deenergization of the home-distant relay 11HD and the placing of the signal S11 in its stop or "R" condition. Deenergization of the home-distant relay 11HD causes deenergization of the home-distant repeater relay 11HDP and the dropping of its contact 51¹¹. Dropping of this contact 51¹¹ of relay 11HDP does not affect the condition of energization of home-distant relay 13HD which it controls, because track relay T11 is now energized and its front contact 52¹¹ is closed as is also the front contact 53¹² of relay 12HD. The polarity of current applied to the circuit for home-distant relay 13HD therefore remains the same (pole-changer relay 11PC energized) and the signal S13 remains clear. It may be pointed out at this juncture that the signal S7 is still held in its danger or R position. This is caused by reason of the fact that the train V1, which still holds the track relay T9 deenergized (see Fig. 10B), holds its contact 44⁹ open and that this in turn holds the home-distant relay 8HD deenergized. This, of course, maintains deenergized the home-distant repeater relay 8HDP which through the medium of its back contact 58⁸ holds the directional stick relay 8S energized. This directional stick relay 8S by being up holds the home-distant relay 7HD deenergized through the medium of its open back contact 46⁸. With the home-distant relay 7HD and its repeater relay 7HDP deenergized the signal S7 will, of course, indicate stop by the illumination of its red signal unit as is indicated by the letter "R" for the signal S7 in Fig. 10B of the drawings, and with repeater relay 7HDP in its deenergized position and with its associated stick relay 7S also down the energizing circuit for relay 9HD will have no current applied thereto.

Let us now assume that the train V1 moves from the position illustrated in Fig. 10B of the drawings, to the position illustrated in Fig. 11B of the drawings. This change in the position of the train causes the track relay T9 to again pick up and by the closure of its front contact 44⁹ allows current of negative polarity, which is applied through back contact 41¹⁰ and 49¹⁰ of the pole-changer relay 10PC to flow to the home-distant relay 8HD, thereby energizing this relay 8HD to its left-hand caution position. The picking up of the relay 8HD results in the reenergization of its repeater relay 8HDP and although the opening of the back contact 58⁸ of the relay 8HDP opens one stick circuit for the directional stick relay 8S this stick relay will not drop. This directional stick relay 8S is now stuck up through a circuit including its stick contact 60⁸, the polar contact 62⁸ of the relay 8HD in its left-hand position, and the front contact 63⁸ of this same home-distant relay 8HD. All home-distant repeater relays HDP are slow to pick-up and slow dropping thereby allowing the new stick circuit to close before the former one is opened. The directional stick relay 8S thus remains energized and continues to hold open, at its back contact 46⁸, the energizing circuit for the home-distant relay 7HD, so that the signal S7 still remains in its danger or R position as indicated in Fig. 11B of the drawings. With the home-distant relay 7HD and its repeater relay 7HDP both deenergized no current is applied to the line circuit for the home-distant relay 9HD, because the directional stick relay 7S is still in its deenergized position, this relay only being picked up for a westbound train movement by the signal S7. This zero application of current to the line circuit extending from signal S7 to signal S9 is indicated by the two zero symbols contained on the arrow extending from signal S7 to signal S9 in Fig. 11B of the drawings.

Let us assume that the train V1 under consideration now moves from the position illustrated in Fig. 11B to the position illustrated in Fig. 12B. This causes the caution tumble-down of opposing signals through the single track stretch D next in advance to take place, because the line circuit for home-distant relay 13HD is pole-changed by the dropping of contacts 41¹¹ and 49¹¹ of pole-changer relay 11PC; the front contact 52¹¹ of track relay T11 now being open, the contact 51¹¹ of the relay 11HDP having been dropped when the train V1 advanced from the position shown in Fig. 9B to the position shown in Fig. 10B. Energization of the home-distant relay 13HD by current of negative polarity will of course operate its contacts $15^{13}$ and $20^{13}$ to the left in which position (stick relay 13S being down) current of negative polarity will be applied to the next home-distant relay in the rear of signal S13. No change of any kind takes place in the signal indications to the rear of the train V1 as is evident from the signal indications illustrated in Fig. 11B and Fig. 12B of the drawings, which are identical. The only difference in the apparatus associated with signals in the rear resides in the fact that the track relay T11 has been deenergized and the track relay T10 has been reenergized.

As the train V1 now advances from the position illustrated in Fig. 12B to the position illustrated in Fig. 13B the movement of this train by the signal S12 causes the directional stick relay 12S to be picked up and stuck up in a manner as already explained, the home-distant relays 12HD and 12HDP of course both being now deenergized by the presence of the train on the track circuit including track relay T12. With the directional stick relay 12S energized, the home-distant relay 10HD is in turn energized by current of reverse polarity through its line circuit including the pole changing contacts $24^{12}$ and $28^{12}$ of the relay 12HDP in their retracted position and including the front contact $23^{12}$ of the directional stick relay 12S and also including front contact $26^{11}$ and $27^{10}$ of the track relay T11 and T10, respectively. With the directional stick relay 10S still energized and with the home-distant relay 9HD still deenergized because its energizing circuit is open at front contacts $16^7$ and $19^7$ of the home-distant repeater relay 7HDP and at front contacts $12^7$ and $14^7$ of stick relay 7S, the home-distant relay 7HD being held deenergized at open back contact $46^8$ of stick relay 8S, the directional stick relay 7S being in its retracted position, the advance of the train V1 by the signal S12 causes reenergization of the home-distant relay 10HD to its left-hand caution position, under which condition of the contacts $50^{10}$ and $54^{10}$ of relays 10HD and 10S are closed to reenergize the pole-changer relay 10PC and to again energize the home-distant relay 8HD by current of normal polarity. This circuit for relay 8HD may be traced from the terminal (+), of a suitable source of current, front contact $41^{10}$ of the pole-changer relay 10PC, through the line circuit for the home-distant relay 8HD already traced hereinbefore, and then through front contact $49^{10}$ of pole-changer relay 10PC. The closure of this energizing circuit and energization of home-distant relay 8HD by current of normal polarity causes the polar contact $62^8$ of this home-distant relay 8HD to be returned to its right-hand position, thereby breaking the stick circuit for the directional stick relay 8S, which included this contact $62^8$, and allowing this stick relay 8S to assume its retracted position. Dropping of the directional stick relay 8S closes its back contact $46^8$ and allows the current of normal polarity, which had been applied to the west end of the energizing circuit for the home-distant relay 7HD ever since the train V1 under consideration passed the signal S6 (see arrows extending from signal S5 to signal S7 in each of the drawings, Figs. 7A to 13A, inclusive) to flow and clear the signal S7. In other words, the closure of back contact $46^8$ of the directional stick relay 8S allows the home-distant relay 7HD to be energized to its normal right-hand position and also allows its repeater relay 7HDP to be picked up and clear signal S7. Under this condition of the relays 7HD and 7HDP the normal energizing circuit for the home-distant relay 9HD is closed thereby causing the signal S9 to be returned to its clear position as was also the signal S7 when its associated home-distant relay 7HD was reenergized to its normal position. Referring again to Figs. 12A, 12B, 13A and 13B of the drawings, it will be understood that the directional stick relay associated with the caution signal S8 under traffic conditions shown in Fig. 12A is still retained in its energized position and blocks the flow of current through the line circuit from the signal S5 to the signal S7 as is indicated by the zero at the middle of the arrow symbolizing this line circuit. Also with the signal S7 held at stop zero potential is applied to the line circuit extending from signal S7 to signal S9 as is manifested by the two zero symbols applied to the arrow symbolizing this line circuit. As the train in question advanced from the position illustrated in Fig. 12B to the position illustrated in Fig. 13B a caution signal S10 followed by a green signal S8 was established behind the train V1 as this train left the passing siding and this changing of the signal S8 from its caution to its clear position deenergized its associated stick relay and allowed the current of normal polarity to flow in the line circuit extending from signal S5 to signal S7 as indicated by the symbol (+) near the middle in the arrow extending from signal S5 to signal S7 and symbolizing this line circuit. Similarly clearing of the signal S7 caused clearing of the signals S9 and S11 to the rear thereof.

West-bound train movement

Referring to Figs. 14A to 25B, inclusive, of the drawings let us now assume the movement of a west-bound train through the section of track including passing sidings A and C and single track section B. Referring to Fig. 14B let us first assume that the vehicle V2 is assuming the position illustrated in this figure. It will be seen from the arrows symbolizing line circuits that no current is applied to the home-distant relay associated with the signal S14 and that this signal S14 applies no current to the line circuit next in the rear thereof as indicated by the two zeros in the arrow extending from the signal S14 to the signal S12. Also, it is seen that the signal S12 applies energy of negative or reverse polarity to the line circuit extending to the signal S10 as is indicated by the two minus (−) signs associated with the arrow symbolizing this line circuit extending from signal S12 to signal S10. Referring now to Figs. 1C and 1D of the drawings it will be seen that the train V2 occupies the track section between signals S12 and S14 and that the presence of this train by the opening of front contact $48^{14}$ of the track relay T14 deenergizes the home-distant relay 14HD which in turn deenergizes the home-distant repeater relay 14HDP. Since the directional stick relay 14S has remained in its deenergized position, this relay picking up only for an east-bound train passing the signal S14, it is readily seen that the line circuit for the home-distant relay 12HD is open at front contacts $12^{14}$ and $14^{14}$ of the directional stick relay 14S, so that the home-distant relay 12HD remains deenergized and its associated signal S12 remains in stop position into which position it was placed by the usual danger tumble-down of signals that occurred when the west-bound train entered the single track section B. It will also be remembered that with the home-distant relay 12HDP deenergized the circuit for the home-distant relay 10HD is energized by current of reverse polarity through back pole-changer contacts $24^{12}$ and $28^{12}$ of relay 12HDP, resulting in the placing of the signal S10 in its caution position, all as indicated by the letters "R" in signals S12 and S14 of Fig. 14B and by the letter "Y" on the signal S10 of this same figure of the drawings.

Let us now assume that the train V2 under consideration has passed over the insulating joints between track batteries B12 and B12A as illustrated in Fig. 15B of the drawings. The presence of this train on the track circuit containing track relay T12 causes deenergization of this track relay and the opening of its front contact $25^{12}$. Since the directional stick relay 12S is in its deenergized position and its front contact $23^{12}$ is open, the opening of contact $25^{12}$ of the track relay T12 in the energizing circuit for the home-distant relay 10HD causes this circuit to be broken, and the home-distant relay 10HD to assume its deenergized position, thereby causing the repeater relay 10HDP to assume its retracted position. Dropping of the relays 10HD and 10HDP will, of course, result in the signal S10 assuming its stop or R position as indicated in Fig. 15B of the drawings. With the home-distant repeater relay 10HDP now in its retracted position the dropping of its contact $51^{10}$ results in the shifting of the energizing circuit from contact $50^{10}$ of relay 10HD to front contacts $52^{10}$ and $53^9$ of relays 9HD and T10 in series. Since these latter two relays are both still energized no deenergization of pole-changer relay 10PC takes place. In other words, the movement of the train V1 over the insulating joints which divide the track circuits between signals S12 and S14 has caused the signal S10 to be operated to the stop condition without changing the next signal in the rear thereof from its clear condition.

Let us now assume that the train V2 under consideration has accepted the signal S11 by passing it, and has entered the main track of the passing siding C (Fig. 16B). This advance of the train has made no change in the signal aspects with the exception of changing the signal S11 from its clear G to its danger R condition as is indicated by the letters "G" and "R" in Figs. 15B and 16B, respectively, and in changing the signal S13 from its danger R to its caution Y condition as is indicated by the letters "R" and "Y" for the signal S13 in Figs. 15B and 16B, respectively. This change of signal S11 from a clear to a danger indication is, of course, due to deenergization of home-distant relay 11HD by the opening of front contact $27^{11}$ of track relay T11. This signal S13 was changed from its danger condition "R" to its caution "Y" condition by the reclosure of the circuit for home-distant relay 13HD at front contact $44^{12}$ of track relay T12, the circuit for relay 11PC having been shifted through back contact $51^{11}$ of relay 11HDP and being open at both of front contacts $52^{11}$ and $53^{12}$ of relays T11 and 12HD, respectively.

As the train V2 under consideration now advances from the first half to the second half of the main track of the passing siding C no change in the signal aspects to the rear occur, but an important change of signal aspects in advance of the train occur.

The advance of the train into the west half of the main track of passing siding C causes deenergization of the track relay T10 and the opening of its front contact $52^{10}$ (relay 10HDP and its contact $51^{10}$ already being down) deenergizes relay 10PC resulting in pole changing of the circuit for home-distant relay 8HD causing energization thereof by current of reverse polarity instead of current of normal polarity. This causes the signal S8 to assume its caution position as indicated by the letter "Y" in Fig. 17A of the drawings. With the home-distant relay 8HD in its reverse position, that is, with its contacts $15^8$ and $20^8$ in the left-hand dotted position, and with the directional stick relay 8S deenergized, the home-distant relay 6HD is energized by current of reverse polarity through a circuit including back contacts $12^8$ and $14^8$ of the directional stick relay 8S, polar contacts $15^8$ and $20^8$ of the relay 8HD assuming their left-hand position, and front neutral contacts $16^8$ and $19^8$ of the home-distant repeater relay 8HDP. This current of reverse polarity has been symbolized by the signs minus (—) contained in the arrow extending from signal S8 to signal S6 in Fig. 17A of the drawings, and symbolizing the line circuit extending from signal S8 to signal S6. In other words, the movement of the train V2 over the insulating joints which divide the track circuits of the main track of passing siding C has caused a caution tumble-down of signals to occur in the single track section beyond the passing siding in advance of the train, namely, the single track section B in the present instance.

Let us now assume that the railway vehicle V2 under consideration has accepted the signal S9 by having its first wheels and axles pass the same. This advance of the train does not change any of the signal aspects in the rear thereof because the rear end of the train is still on the main track of passing siding C. The front portion of the train has, however, passed the signal S9 and this has caused the danger tumble-down of signals through the single track section B to occur. In the first place, the movement of the front end of the train by the signal S9 has caused the directional stick relay 9S to be picked up and stuck up all in a manner as already heretofore described. With this directional stick relay 9S now energized, its front contact $23^9$ allows current of reverse polarity applied by the back contacts $24^9$ and $28^9$ of the home-distant repeater relay 9HDP to flow to the home-distant relay 11HD next in the rear of signal S9 as soon as the main track portion of the passing siding becomes vacated. This condition of the apparatus is symbolized by the minus (—) sign applied to the tail end of the arrow extending from signal S9 to signal S11 in Fig. 18B of the drawings, the symbol zero (0) near the middle of this arrow signifying that this line circuit is, however, open by reason of the open front contact $26^{10}$ of the track relay T10 (see Fig. 1C) in the energizing circuit for home-distant relay 11HD. With the home-distant relays 10HDP and 9HD deenergized and with their front contacts $51^{10}$ and $53^9$ down the pole-changer relay 10PC is, of course, in its retracted position to apply current of negative polarity to the line circuit extending to signal S8 as is indicated by the sign (—) at the tail end of the arrow extending from signal S10 to signal S8 in Fig. 18B. The relay 10PC will, however, pick up as soon as the rear end of the train passes signal S9 and will apply current of normal polarity to relay 8HD as shown by the sign (+) at the tail end of the arrow extending from signal S10 to signal S8 in Fig. 19B. This current of reverse polarity can, however, not flow to the home-distant relay 8HD because the presence of that portion of the train ahead of the signal S9 has caused deenergization of the track relay T9 and has caused the opening of front contact 44⁹ of the track relay T9 included in the line circuit for home-distant relay 8HD. With the home-distant relay 8HD deenergized, as just explained, and its associated repeater relay 8HDP in its retracted position, and with its associated directional stick relay 8S deenergized, the line circuit E extending from the signal S8 to the home-distant relay 6HD is maintained open at front contacts 12⁸ and 14⁸ of the directional stick relay 8S. This open line circuit condition is symbolized in Fig. 18A of the drawings by the two zeros (0) applied to the arrow extending from signal S8 to signal S6. The home-distant relay 6HD, therefore, assumes its retracted position resulting in its repeater relay 6HDP also assuming its retracted position. With both of these relays 6HD and 6HDP deenergized the signal S6 will indicate danger as indicated by the letter "R" for the signal S6 in Fig. 18A of the drawings. It will be remembered that with the home-distant repeater relay 6HDP deenergized and its pole-changer contacts 24⁶ and 28⁶ in their retracted position, the home-distant relay 4HD, next to the rear thereof, will be energized by current of reverse polarity. This current of reverse polarity has been indicated by the two minus (—) signs applied to the arrow extending from signal S6 to signal S4 in Fig. 18A of the drawings.

Let us now assume that the vehicle V2 under consideration advances from the position illustrated in Fig. 18B to the position illustrated in Fig. 19B. This causes no change in the signal aspects in advance of the train, but it does allow the restoration of the signal S10 to its clear condition. Since the train V2 has now vacated the main track of the passing siding C (see Fig. 19B) the current of reverse polarity which had formerly been applied to the line circuit extending from signal S9 to the home-distant relay 11HD next to the rear thereof, is now allowed to flow as is indicated by the symbol minus (—) near the middle of the arrow, extending from signal S9 to signal S11 in Fig. 19B of the drawings. The flow of this current of reverse polarity will, of course, allow the home-distant relay 11HD to assume its left-hand position and allow the signal S11 to give a caution or Y indication as is manifested by the letter "Y" for the signal S11 shown in Fig. 19B of the drawings. With the home-distant relay 11HD energized to its caution position, and with its repeater relay 11HDP energized, current may again flow to the winding of the pole-changer relay 11PC through a special circuit including the front contact 54¹¹ of the directional stick relay 11S, as a result of which current of normal polarity is applied to the line circuit extending to the home-distant relay 13HD next in the rear thereof. It should be noted that the directional stick relay 11S is still energized even though the relays 11HD and 11HDP are now both up, it being held energized through contacts 38¹¹ and 39¹¹ of relay 11HD which are closed when the relay 11HD is energized by current of reverse polarity, namely, to the caution position. The current of normal polarity applied to the winding of the home-distant relay 13HD causes its polar contacts to be shifted to the normal right-hand position. The movement of the polar contact 62¹³ to its right-hand position opens the third stick circuit for the directional stick relay 13S which maintained this stick relay energized during the movement of the train through the main track of the passing siding C, so that this directional stick relay 13S is now deenergized and assumes its retracted position. Dropping of the stick relay 13S causes closure of its back contact 46¹³ included in the energizing circuit for the home-distant relay 14HD, so that the current of normal polarity which was formerly applied to this line circuit may now flow to the home-distant relay 14HD and cause this relay to return to its normal right-hand energized position and in turn cause its repeater relay 14HDP to return to its energized position. With these relays 14HD and 14HDP now energized to their normal position the signal S14 is returned to its clear condition as is indicated by the letter "G" for the signal S14 in Fig. 19B of the drawings. With the relays 14HD and 14HDP now again assuming their normal position and since there is no train in the track circuit next to the rear of the signal S14 the energizing circuit for the home-distant relay 12HD is now again energized by current of normal polarity causing the signal S12 to give a clear indication as is symbolized by the letter "G" for the signal S12 in Fig. 19B of the drawings. Also, with the home-distant relay 12HD and its repeater relay 12HDP now both energized current of normal polarity is applied to the home-distant relay 10HD through a circuit heretofore traced, thus resulting in the home-distant relay 10HD and its repeater relay 10HDP returning to their normal energized position, resulting in the clearing of the signal S10 as is indicated by the letter "G" for the signal S10 in Fig. 19B of the drawings. Referring to Figs. 18B and 19B of the drawings, it was the dropping of the directional stick relay associated with the signal S13 that caused the signals S14, S12 and S10 to be moved from their danger R condition to their clear G condition, as indicated in Figs. 18B and 19B of the drawings, respectively. The change which took place in the line circuits controlling these signals S10, S12 and S14 is also clearly indicated by the symbols associated with the arrows symbolizing these line circuits for controlling these signals in Figs. 18B and 19B, respectively.

Let us now assume that the railway vehicle V2 under consideration has advanced from the position illustrated in Fig. 19B to the position illustrated in Fig. 20A. The movement of the train by the signal S7 would, of course, cause the directional stick relay 7S to be picked up and stuck up and the directional stick relay 9S to drop, all in a manner as already described. Also, the presence of the train directly ahead of this signal S7 retains the track relay T7 in its deenergized position, thereby holding the home-distant relay 7HD and its repeater relay 7HDP deenergized. With these relays 7HD and 7HDP deenergized the signal S7 will, of course, indicate stop, and with the directional stick relay 7S now energized current of reverse polarity is applied to the home-distant relay 9HD through the line circuit W9, and including front contacts 12⁷ and 14⁷ of the directional stick relay 7S and back contacts 16⁷ and 19⁷ of the home-distant repeater relay 7HDP. With the home-distant relay 9HD energized to its reverse position and its repeater relay 9HDP energized, current of (+) polarity is applied to the line circuit for the home-distant relay 11HD all for reasons heretofore described. This condition of the line circuits for home-distant relays 9HD and 11HD is indicated by the minus (—) signs applied at two points to the arrow extending from signal S7 to signal S9, and the plus (+) signs applied at two points to the arrow extending from signal S9 to the signal S11 in Fig. 20B of the drawings. This advance of the train from the position illustrated in Fig. 19B to the position illustrated in Fig. 20A does not change any of the signal aspects ahead of the train so that the indicating conditions of these opposing signals need not be discussed.

Let us now assume that the railway vehicle V2 under consideration advances from the position illustrated in Fig. 20A to the position illustrated in Fig. 21A. With the vehicle V2 assuming the position illustrated in Fig. 20A the line circuit extending from signal S10 to signal S8 as symbolized by the arrow extending from signal S10 to signal S8 in Fig. 20B of the drawings is held open by the presence of the train on the track circuit including track relay T8, namely, by the open contact 48$^8$ of this track relay T8. In Fig. 21A, however, the train V2 has advanced entirely off of this track circuit containing track relay T8 and in spite of this fact the home-distant relay 8HD is still deenergized, as conventionally shown by the symbol zero (0) in the arrow extending from the signal S10 to the signal S8 shown in Fig. 21A of the drawings. The flow of current in this line circuit extending to the home-distant relay 8HD is however prevented by reason of the open back contact 46$^7$ of the directional stick relay 7S. The movement of the train from the position illustrated in Fig. 20A to the position illustrated in Fig. 21A has, however, not caused any change in the indication of any signal either ahead or behind the train. although, as already pointed out, the signal S8 is held in its stop position by the open back contact 46$^7$ of the directional stick relay 7S, rather than by the open front contact 48$^8$ of the track relay T8 as was the case before the train passed the opposing signal S8.

Let us assume that the west bound train V2 under consideration has now advanced from the position illustrated in Fig. 21A of the drawings to the position illustrated in Fig. 22A of the drawings. This advance of the train by the insulating joints 10 between the track batteries B6 and B6A causes the opposing signal S4 to be operated from its caution or Y position to its danger or R position, as illustrated by the letters "Y" and "R" for signal S4 in Figs. 21A and 22A of the drawings. The signal next in the rear of signal S4 will however not change but will remain clear, because the dropping of the home-distant repeater relay 4HDP, due to the opening of front contact 25$^6$ of track relay T6, produces no effective change in the energizing circuit of polechanger relay 4PC. In other words, dropping of the contact 51$^4$ of the relay 4HDP does not open the energizing circuit for relay 4PC but merely shifts it through front contacts 52$^4$ and 53$^3$ of relays T4 and 3HD, respectively, which are still both closed. Referring to Fig. 22A of the drawings, it will be seen that the track switch Sw5—6 has been illustrated as assuming its take-siding position. This operation of the track switch Sw5—6 to its take-siding position closes the switch repeating contact 2Sw5—6 shunting the track circuit containing the track relay T5, which for obvious reasons results in placing the signal S5 in its stop or R condition, as shown in Fig. 22A, the signal S4 having been put to stop by the opening of front contact 25$^6$ of track relay T6 due to the presence of the train V2. The dropping of this track relay T5 at a time when the track relay T6 is deenergized would cause a pick-up circuit for the directional stick relay 5S including the contacts 30$^6$ and 31$^5$ of the track relays T6 and T5, respectively, to be closed were it not for the fact that this pick-up circuit is now open at switch repeating contact 1Sw3—4. The opening of the track switch Sw5—6 also performs another function, namely, the opening of switch repeating contact 1Sw5—6 and the sequential dropping of slow acting push button repeating relays PBR5—6 and PBRP5—6. The sequential dropping of these relays causes momentary opening of the line circuit for home-distant relay 7HD at one point, but this produces no particular result in that this line circuit was already continuously open at front contact 44$^6$ of the track relay T6. Had this circuit however been energized by current of reverse polarity, in which case the stick relay 7S would have been energized through a stick circuit including front contact 63$^7$ of home-distant relay 7HD, momentary dropping of this relay 7HD would have resulted in permanent dropping of directional stick relay 7S.

Let us now assume that the train V2 under consideration moves from the position in the single track section shown in Fig. 22A in the drawings to the position on the side track of the passing siding A as illustrated in Fig. 23A of the drawings. This advance of the train off of the track circuit directly to the rear of the signal S5, namely, the track circuit including the track relay T6 allows the flow of current of negative polarity over the line circuit W7 to the home-distant relay 7HD next in the rear. The flow of this current of reverse polarity is indicated by the symbol minus (—) shown near the middle of the arrow extending from signal S5 to signal S7 in Fig. 23A of the drawings, as distinguished from the symbol zero (0) shown near the middle of a similar arrow shown in Fig. 22A of the drawings. This flow of current of reverse polarity to the home-distant relay 7HD allows the signal S7 to assume the caution position. With the home-distant relay 7HD now energized to its caution or left-hand position a supplemental stick circuit for the directional stick relay S7 is closed, which stick circuit includes the polar contact 62$^7$ of the relay 7HD in its left-hand position, so that the directional stick relay 7S continues to be energized and at its open back contact 46$^7$ prevents the closure of the energizing circuit for the home-distant relay 8HD, so that the signal S8 remains in its danger or "R" position as illustrated in Fig. 23A of the drawings. It is, of course, understood that the side track of the passing siding A is not track circuited and that the train has now entirely disappeared from the signaling system insofar as the manifestation of its presence by track circuits is concerned, that is, the train is now occupying the non-track circuited side track of the passing siding A. It is observed, however, that the signals S4, S5, S6 and S8 still assume the danger or R indicating condition and that the signal S7 still indicates caution as illustrated by the letter "Y" for the signal S7 in Fig. 23B of the drawings.

Let us now assume that the brakeman of the train V2 returns the track switch Sw5—6 to its normal main track position as illustrated in Fig. 24A, as distinguished from the reverse position illustrated in Fig. 23A. This return of the track switch Sw5—6 to its normal main track position opens the track switch repeating contact 2Sw5—6. This allows the track relay T5 to again pick up and close its contacts 26$^5$ and 27$^5$ included in the energizing circuits for the home-distant relays 4HD and 5HD, respectively. The picking up of this track relay T5 and of the home-distant relays 4HD and 5HD causes the signals S4 and S5 to return to their clear or G indicating condition. The signals S6 and S8 will, however, not immediately return to their clear indicating condition because the directional stick relay 7S associated with the signal S7 must first be deenergized in response to the clearing of the signal S7 or rather the return of the home-distant relay 7HD to its normal right-hand energized position in which position the auxiliary stick circuit including the polar contact $62^7$ of the home-distant relay 7HD is broken. Dropping of the directional stick relay 7S will reclose the back contact $46^7$ of this relay 7S, which in turn will allow the home-distant relay 8HD to be reenergized to its normal right-hand polar position. In this position of relay 8HD current of normal polarity is applied to the normal energizing circuit for the home-distant relay 6HD, so that both the signal S8 and the signal S6 are returned to their normal clear or G indicating condition, as illustrated by the letters "G" for the signals S6 and S8 in Fig. 24A of the drawings. This restoration of the signals S6 and S8 to their clear position is indicated conventionally by the letters "G" and also by the symbol (+) shown for the arrow extending from signal S10 to signal S8 and for the arrow extending from signal S8 to signal S6 in Fig. 24A of the drawings, as distinguished from the zero (0) symbols illustrated in the middle of similar arrows shown in Fig. 23A of the drawings. The train under consideration is now occupying the non-track circuited side track of the passing siding A as illustrated in Fig. 24A and all of the signals of the signaling system are in their clear or G indicating condition as illustrated by the letters "G" in Figs. 24A and 24B of the drawings.

Let us assume that the brakeman on the train V2 now proceeds to move the track switch Sw3—4 to its take-siding position as conventionally illustrated in Fig. 25A of the drawings. This movement of the track switch Sw3—4 to its take-siding position causes closure of the track switch repeating contact 2Sw3—4 thereby short circuiting the track relay T4 and causing this track relay to assume its retracted position. Dropping of the track relay T4 causes deenergization of the home-distant relay 4HD and 5HD thereby causing the signals S4 and S5 to assume the stop position. The operation of the home-distant relay 4HD and 5HD and their repeater relays 4HDP and 5HDP to their deenergized positions at a time when all the directional stick relays and particularly the directional stick relays 2S (not shown but signal S2 is shown in Fig. 26A) and 7S are deenergized, as is now the case, causes the usual caution tumble-down of signals in a westwardly direction away from the passing siding through the single track section to occur. Although both of the entering signals S4 and S5 now assume the danger condition and the signal S2 to the rear of the signal S4 assumes the caution condition as illustrated by the symbols minus (—) applied to the arrow extending toward the rear from signal S4, the signals S7 and S9 to the rear of the signal S5 do not indicate caution, because the caution tumble-down toward the east does not occur. That is, the caution tumble-down of signals does not take place in the single track stretch B remote from the track switch Sw3—4 which was opened. The two entering signals S4 and S5 are put to stop by the opening of front contacts $27^4$ and $26^4$ of track relay T4 respectively and the two signals S2 and S8 to the rear of signal S4 are put to caution by the dropping of pole-changer relay 4PC due to dropping of track relay T4 and the opening of its contact $52^4$ included in the energizing circuit of relay 4PC when relay 4HDP is down as is now the case. In other words, it is the dropping of contacts $51^4$ and $52^4$ that causes the caution tumble-down of signals and the contact $52^5$ of relay T5 at the east end of the passing siding A is still up in spite of the open track switch Sw3—4 at the west end. The railway vehicle V2 under consideration may now proceed into the single track section to the left of the siding A, this on the assumption that there is no train in advance moving in either direction to interfere with the clear indication of the signal S3 which governs the movement of the train in a westerly direction from the passing siding A. As such train moves westwardly into the single track section the directional stick relay 3S will not pick up because the switch repeating contact 1Sw3—4 is open at this time, so that the signal S5 will not indicate caution until the train V2 has passed off the track circuit including track relay T3 with track switch Sw3—4 reclosed. Should the engineer of the train V2 desire to make a back up move out of the single track section located to the left of passing siding A into the main track of passing siding A and then into the single track section B, such train movement can be made at speed because all east-bound signals to the right of passing siding A as well as signal S4 (assuming switch Sw3—4 has been reclosed) are clear.

*Two trains making a meet*

Referring to Figs. 26A to 27B, inclusive, the manner in which two trains may make a meet and the signal indications given by the various signals when trains approach to make such a meet at a passing siding will now be considered.

Referring to Figs. 26A, 27A, 28A and 29A the train V3 assumes the same position in each of these figures as is assumed by the train V1 in Fig. 7A of the drawings, with the exception that the train V3 in Figs. 26A, 27A, 28A and 29A approaches the east-bound intermediate signal S2, whereas the train V1 in Fig. 7A approaches a similar east-bound intermediate signal S8. Since, however, these signals S2 and S8 are corresponding signals of different single track sections and the control circuits for these signals and their associated signals is identical the nature of the control circuit for signal S2 may be obtained from Fig. 1B. For this reason the manner in which signals S1 and S3 are held to stop and signal S5 is held to caution in Figs. 26A to 29A will not be described specifically.

Referring now to Fig. 26B of the drawings, the train V4 assumes a position on the signaling system which is the same as the position assumed by the train V2 on Fig. 14B of the drawings. For this reason the manner in which signals S14 and S12 are held at stop, as shown by the letters "R," and the manner in which the signal S10 is held at caution, as shown by the letter "Y," will not be specifically pointed out.

Referring now to Figs. 27B of the drawings in which the train V4 has advanced by the opposing signal S14. This advance in the position of the train V4 results in no change of signal aspects to the rear of the train, and only changes one signal aspect ahead of the train. That is, the signals S12 and S10 both indicate stop by the illumination of their red lamps as indicated conventionally by the letters "R" applied to these signals S12 and S10, whereas before the train advanced to this new position the signal S10 was at caution. This movement of the signal S10 from caution to stop was due to the opening of the energizing circuit of home-distant relay 10HD at front contact 25¹² of track relay T12. Even though the signal S10 has been operated to stop the next signal to the rear thereof (signal S8) remains in its clear position for reasons already explained.

Referring now to Fig. 28B wherein the train V4 under consideration has passed the entering signal S11 and has put this signal in its stop or R position, and in turn has put the signal S13 in its caution position as indicated by the letter "Y." In all other respects the signals in the rear of the train V4 when occupying the main track of the passing siding as illustrated in Fig. 28B are the same as illustrated in Fig. 27B.

Another important change of signal aspects of opposing signals ahead of the train, has however, taken place, namely, the caution tumble-down of signal in the single stretch B in advance of the train has taken place. That is, opposing signals S8 and S6 have been operated to caution for the same reasons that signals S8 and S6 of Fig. 17A were operated to caution, so that no more discussion as to the caution tumble-down function need be given.

With the train V3 still occupying the track section directly to the rear of the signal S2 (see Fig. 29A), and with the train V4 presently passing off of the main track of the passing siding C, as illustrated in Fig. 29B of the drawings, a very important operation of the signaling system takes place. As is evident from the description heretofore given and by studying the circuits associated with the signal S7 for controlling the home-distant relay 9HD and its signal S9 next in the rear of signal S7, it is apparent that with the directional stick relay 7S deenergized the home-distant relay 9HD directly repeats the home-distant relay 7HD. In other words, if the home-distant relay 7HD is energized to its normal position the energizing circuit for the home-distant relay 9HD is energized by a current of normal polarity. If the home-distant relay 7HD is energized to its left-hand reverse position, the home-distant relay next in the rear thereof, namely, the relay 9HD, is energized by current of reverse polarity and if the home-distant relay 7HD and its repeater relay 7HDP are deenergized then no current is applied to the energizing circuit for the home-distant relay 9HD next in the rear, assuming in each case that the directional stick relay 7S is in its retracted position. Referring now to Figs. 28A and 28B of the drawings, it would, of course, be desirable to have the signal S9 display a clear indication when there is a train V3 to the rear of the signal S2 (see Fig. 28A), because the trains are sufficiently far apart to at times at least allow the train V4 to pass entirely through the single track section extending from signal S9 to signal S6, and to make a meet with the train V3 at the passing siding A, but at the same time it would be desirable to display a caution indication by the signal S7 when the train V4 is about ready to pass this signal S7 with an opposing train just to the rear of signal S2. As already pointed out the signal S9 repeats the signal S7 with the exception of the presence of a train between these two signals or when a train has passed signal S7 and picked up its stick relay 7S. In order to manifest caution traffic conditions by the signal S7 and also by the signal S2 when two trains, such as trains V4 and V3, approach these respective signals, very special circuit facilities have been provided to cause these two signals to indicate caution when they are simultaneously about to be passed by a train moving in the direction in which these signals govern traffic. These signaling facilities will now be discussed.

Refer to Fig. 29B and let us assume that the train V4 has just accepted the clear signal S9, as shown. The first wheels and axles of this train V4 are now short circuiting the track circuit containing track relay T9 so that the signal S9 is operated to its stop position. For reasons already explained the entrance of a train into a single track section causes a danger tumbledown of signals to occur, thereby causing the signals S8 and S6 to indicate danger as manifested by the letter "R" applied to these signals in Fig. 29A of the drawings. That is, these signals S8 and S6 indicate danger for the same reason that signals S8 and S6 in Fig. 18A of the drawings indicate danger, all for reasons as described in connection with the discussion of train movements as indicated in Figs. 18A and 18B of the drawings. In other words, the home-distant relay 6HD associated with the signal S6 is now deenergized by reason of the tumble-down effected by the train V4 entering the single track section extending from passing siding C to passing siding A. Referring now to Fig. 1A of the drawings, it will be seen that with the home-distant relay 6HD and its repeater relay 6HDP deenergized due to the danger tumble-down caused by the presence of the train V4 at a point as indicated in Fig. 29B of the drawings, and with the home-distant relay 5HD assuming its left-hand caution position by reason of the danger tumble-down of signals S1 and S3 caused by the entrance of the train V3 into the single track section shown in Fig. 29A, and that an energizing circuit for the home-distant relay 7HD has been established for giving a second caution signal to the rear of the caution signal S5. This circuit is established in response to the presence of both of the trains V3 and V4 at points as illustrated in Figs. 29A and 29B of the drawings. The same signal indications would of course also be given if the train V3 occupied the second track circuit to the rear of signal S2. This circuit for home-distant relay 7HD is energized by current of reverse polarity due to dropping of the pole-changer relay 5PC. This pole-changer relay was dropped because with the polar contact 50⁵ of relay 5HD to the left it remained held energized through front contacts 52⁵ and 53⁶ of the relays T5 and 6HD, respectively and back contact 54⁵ of relay 5S. The dropping of the home-distant relay 6HD upon performance of the danger tumble-down function therefore caused dropping of polechanger relay 5PC, which in turn pole changed the circuit for the home-distant relay 7HD and caused operation of the signal S7 to its caution condition. This new caution indication of signal S7 is conventionally indicated by the letter "Y" in Fig. 29B of the drawings. In a similar manner, a special caution circuit is established for the home-distant relay for the signal S2 (see Fig. 29A of the drawings) as is conventionally indicated by the symbols (—) shown at the tail end and at an intermediate point in the arrow extending from signal S4 to signal S2, and as indicated by the letter "Y" on signal S2 shown in Fig. 29A of the drawings. This circuit for the home-distant relay 2HD (not shown) is in part shown in Fig. 1A of the drawings and the portion illustrated may be traced as follows: beginning at the terminal (—) of a suitable source of current, back contact $49^4$ of the pole-changer relay 4PC, front contacts $42^{3-4}$ and $43^{3-4}$ of the push button relays PBR$^{3-4}$ and PBRP$^{3-4}$, respectively, front contact $44^3$ of the track relay T3, through the wire E extending to the home-distant relay 2HD (not shown) associated with the signal S2 (shown in Fig. 29A) and back over the common return wire C through back contact $41^4$ of the pole-changer relay 4PC, to the other terminal (+) of the same source of current. In other words, even though the trains V3 and V4 both approach clear signals in Figs. 28A and 28B of the drawings and even though the train V4 had two successive clear signals ahead thereof in Fig. 28B of the drawings, the movement of the train V4 by the signal S9 with the train V3 standing still at a point anywhere between the signals S2 and S0 will cause the signals S2 and S7 to both change from the clear to the caution indicating condition. In other words, the train V4 has not only caused a danger tumble-down through the single track section which it entered, but it in conjunction with the presence of train V3 also produced double caution indications by signals S4 and S2 for this opposing train V3 approaching in the single track section next in advance. What has been said about the train V4 causing two opposing danger signals followed by two opposing caution signals in the rear thereof is also true of the train V3 which causes the signals S1 and S3 to assume the danger (or R) position and causes the signals S5 and S7 to give a caution indication as indicated by the latter "Y" for these signals S5 and S7 in Figs. 29A and 29B of the drawings.

As the trains V3 and V4 now proceed in opposite directions both moving toward the passing siding A and as they assume the positions illustrated in Figs. 30A and 30B of the drawings, as distinguished from the positions which they assumed in Figs. 29A and 29B of the drawings, it will be seen that both of these trains had a caution signal next in advance thereof in Figs. 29A and 29B. That is, both of these trains have accepted a caution signal when they passed signals S2 and S7, respectively, and that for this reason the trains are presumably reducing their speed so as to be ready to stop within vision of danger ahead when they reach the next signal ahead, namely, the signal governing entrance to the passing siding A. Both of these trains V3 and V4 have, of course, picked up a directional stick relay as they passed the signals S2 and S7, respectively. These directional stick relays 2S (not shown) and 7S maintain the opposing line circuit open at their respective open back contacts 46 so that the circuits for the next opposing signal ahead of each of these trains is held open by this open back contact 46 in addition to being held open by open track relay contacts. Since the indications given by the signals S3, S4, S5, S6 and S8 located between the vehicles V3 and V4 assume the same indicating conditions in Figs. 30A and 30B as they did heretofore (see Figs. 29A and 29B) the control circuits for these signals will not be further discussed at this time.

Referring now to Fig. 31A of the drawings it will be seen that the vehicle V3 has passed the insulating joints located between track batteries B3 and B3A (see Fig. 1A of the drawings) and that for this reason the vehicle V3 has operated the signal S5 from its caution or "Y" indicating condition to the danger or "R" indicating condition. In other words, the trains V3 and V4 are now faced by caution and a danger signal, respectively, directly ahead thereof, so that these trains must be brought to a speed low enough to enable them to stop within vision of danger ahead.

Although specific train positions have been assumed in Figs. 29A and 29B of the drawings to illustrate how each train may face two successive caution signals followed by two successive danger signals it should be understood that both of these trains may assume any position in their respective single track sections to the rear of such caution signal with the same result. Also, either train when it approaches the first signal beyond the head block signal in a single track section will find such signal at caution if there is an approaching train anywhere in the next single track section ahead, this being apparent from the discussion above.

Let us now assume that the train V3 has passed into the main track of the passing siding A as illustrated in Fig. 32A of the drawings. This movement of the train into the main track of the passing siding A causes the signals in the rear of this train to assume the same indications as do the signals to the rear of the train V1 illustrated in Figs. 11A and 11B of the drawings as already described hereinbefore.

Let us also assume that the train V4 has now advanced from the position illustrated in Fig. 31B of the drawings to the position illustrated in Fig. 32B of the drawings. No particular change in signal indications takes place, but attention is directed to the fact that the dropping of the track relay T6 by the opening of its front contact $25^6$ (see Fig. 1A) has caused zero potential to be applied to the line circuit extending to home-distant relay 4HD. This removal of potential from this line circuit is indicated by the two symbols zero (0) associated with the arrow extending to signal S6 to signal S4 in Fig. 32A of the drawings.

Let us now assume that the brakeman on the train V4 opens the track switch Sw5—6 (conventionally shown in Fig. 32A) to allow his train to move into the side track of the passing siding A. Although this movement of the track switch Sw5—6 causes the switch repeating contact 2Sw5—6 (see Fig. 1A) to be closed, this does not change the condition of the signal apparatus because the track circuit including the track relay T5 which was shunted by the closure of this contact 2Sw5—6 merely opens two additional contacts $26^5$ and $27^5$ in the energizing circuits for the home-distant relays 4HD and 5HD. Let us now assume that the train V4 has passed entirely into the side track of the passing siding A as illustrated in Fig. 33A of the drawings. Since this movement of the train into the side track of the passing siding was accompanied by the presence of the train V3 on the main track circuit containing the track relay T5, the signal S7 was held in its stop position so long as the train V4 remained on the track section containing track relay T6. As soon as this train V4, however, allowed the reenergization of the track relay T6 by its movement into the side track of the passing siding, the current of negative polarity which was applied to the source end of the line circuit extending to the home-distant relay 7HD was allowed to flow, so that this signal S7 is changed from its stop or "R" condition to its caution or "Y" condition as indicated in Fig. 33B of the drawings. The directional stick relay associated with this signal S7 is therefore still energized (indicated by note in Fig. 33B) because its stick circuit through the contacts $62^7$ and $63^7$ of the home-distant relay 7HD are still closed.

Let us now assume that the brakeman for the train V4 (this train still occupying the side track of the passing siding A) now operates the track switch Sw5—6 from its take-siding position (shown in Fig. 33A) to its main track position (shown in Fig. 34A). This operation of the track switch to its main track position opens the switch repeating contact 2Sw5—6 and recloses the switch repeating contact 1Sw5—6. The closure of this latter switch repeating contact reapplies energy to the push button relay PBR5—6, this relay PBR5—6 and its repeater relay PBRP5—6 both having been deenergized so long as the track switch Sw5—6 assumed the take-siding position. During the time of deenergization of these relays PBR5—6 and PBRP5—6 the line circuit for the home-distant relay 7HD passed through back contacts $42^{5-6}$ and $43^{5-6}$ instead of passing through these same contacts assuming their attracted position. As the push buton relay PBRP5—6 is now picked up in response to the closure of the switch repeating contact 1Sw5—6 it will be operated to its energized position prior to the picking up of its repeater relay PBRP5—6, so that the front contact $42^{5-6}$ of the relay PBR5—6 is closed, whereas the front contact $43^{5-6}$ of the repeater relay PBRP5—6 is still open. In other words, the closure of the switch repeating contact 1Sw5—6 causes sequential operation of the contacts $42^{5-6}$ and $43^{5-6}$, so that the line circuit for the home-d stant relay 7HD is momentarily broken. This momentary breaking of the energizing circuit for the home-distant relay 7HD causes momentary opening of the front contact $63^7$ of this relay 7HD. Since there was, just prior to this time, only one stick circuit closed for the directional stick relay 7S, namely, the stick circuit including the polar contact $62^7$ of this relay 7HD, assuming its left-hand position, and the neutral front contact $63^7$ of this same home-distant relay 7HD, this momentary opening of the front contact $63^7$ of relay 7HD will cause deenergization of the directional stick relay 7S (indicated by note in Fig. 34B). The dropping of this relay 7S, by the closure of its back contact $46^7$, allows the current of normal polarity, which was applied by the apparatus associated with the signal S10, to the line circuit for the home-distant relay 8HD to flow, thereby causing this signal S8 to give a clear indication as indicated by the letter "G" for this signal S8 in Fig. 34B of the drawings. The flow of this current is also conventionally shown by the symbol (+) shown at the middle of the arrow extending from the signal S10 to the signal S8 in Fig. 34B of the drawings. The clearing up of the signal S8 causes the signal S6 next to the rear thereof to also give a clear indication (see Fig. 34A) all in a manner and for reasons already described, so that the train V3 may now proceed in an eastwardly direction without being restricted by adverse signal indications, all of the signals ahead of this train V3 indicating clear traffic conditions as illustrated in Figs. 34A and 34B of the drawings.

Referring again to Fig. 33A it will be seen that the train V4 is confronted with a danger signal S3, as manifested by the letter "R," applied to the signal S3, and that there is another signal S1 in advance of this signal S3, which signal S1 also indicates danger.

Let us now assume that the brakeman of the train V4 alights from the train and proceeds to operate the track switch Sw3—4 to its take-siding position. This operation of the track switch Sw3—4 to its take-siding position closes the switch repeating contact 2Sw3—4. The closure of this switch repeating contact 2Sw3—4 however produces no material change in the condition of the signaling apparatus, because the closure of this contact merely results in deenergization of the track relay T4, the dropping of which track relay T4 merely opens additional contacts $26^4$ and $27^4$ in the energizing circuits for the home-distant relays 5HD and 4HD, respectively, and in the opening of contact $52^4$ in an already open circuit of pole-changer relay 4PC. The operation of this track switch Sw3—4 to its take-siding position however also opens the switch repeating contact 1Sw3—4. The opening of this latter switch repeating contact causes deenergization of the push button relay PBR3—4, the dropping of which is followed by deenergization of the circuit for push button repeater relay PBRP3—4. Since the push button relay PBR3—4 assumes its deenergized position a considerable time before its repeater relay PBRP3—4 assumes its deenergized position the circuit including the line wire E for the home-distant relay 2HD (not shown) and controlled by these relays PBR3—4 and PBRP3—4 is momentarily broken at the front contact $42^{3-4}$ or relay PBR3—4 and at back contact $43^{3-4}$ of relay PBRP3—4. The momentary breaking of this energizing circuit including this line wire E causes momentary deenergization of the home-distant relay 2HD (not shown) associated with the signal S2 shown in Fig. 34A of the drawings. The momentary dropping of this home-distant relay 2HD (not shown but controlled in exactly the same way as home-distant relay 8HD is controlled) results in momentary opening of an auxiliary stick circuit for the directional stick relay 2S (not shown but controlled in the same manner as directional stick relay 8S is controlled) so that this directional stick relay 2S is deenergized and at its back contact $46^2$ (not shown) recloses the energizing circuit for the home-distant relay 1HD (not shown) for controlling the signal S1. Picking up of this home-distant relay 1HD (not shown) in turn causes the application of current of plus (+) polarity to the energizing circuit for the home-distant relay 3HD shown in Fig. 1A of the drawings. This control of these various circuits which are not illustrated is, however, conventionally shown by the symbol plus (+) applied to the middle of the arrow and shown directly above the signal S2 in Fig. 34A of the drawings, and by the symbols plus (+) applied to the arrow extending from signal S1 to signal S3 in Fig. 34A of the drawings. In other words, the opening of the track switch directly ahead of the train V4, namely, the track switch Sw3—4 (see Fig. 1A) causes momentary opening of the line circuit which controls the signal S2 thereby causing the directional stick relay associated with this signal S2 to be permanently deenergized and dropped. Deenergization of the directional stick relay 2S causes the danger tumble-down function heretofore performed to be discontinued and allows the clearing of the signals S1 and S3. The trains V4 and V3 now assume the positions as illustrated in Figs. 34A and 34B of the drawings and the signals associated therewith display indications as illustrated. It will be seen that each train faces a clear signal and may proceed into its single track section in the absence of other trains ahead as has been assumed. Attention is also directed to the fact that the signal S0 directly to the rear of signal S2 and the signal S7 directly to the rear of signal S9 assume the caution condition; whereas, these signals S3 and S5 assumed the clear condition in Figs. 34A and 34B of the drawings. This is due to the fact that directional stick relay 2S (not shown) was dropped by opening of track switch Sw3—4 and directional stick relay 7S was dropped by closing track switch Sw5—6.

Referring to Fig. 33A of the drawings, it is apparent as there shown that signal S3 is at stop but it is uncertain whether there is an eastbound train moving in the single track section. It is not good practice for the brakeman to open a track switch if he is uncertain whether there is a train approaching. In practicing the invention the brakeman of train V4 will, therefore, preferably first depress the push button PB3—4 (Fig. 1A) which will if there is no approaching train between signals S2 and S4 as already pointed out, result in momentary opening of the control circuit for home-distant relay 2HD (not shown) for the same reason that opening of switch repeating contact 1Sw3—4 caused momentary opening of this control circuit through the medium of contacts 42³⁻⁴ and 43³⁻⁴. Momentary dropping of relay 2HD (not shown) will result in continuous dropping of directional stick relay 2S (not shown) which will result in clearing of signals S1 and S3 in the absence of an east-bound train approaching these opposing signals. In other words, the push button PB3—4 by being depressed enables the signal S3 to be cleared up, in the absence of adverse traffic conditions, without actual movement of the track switch Sw3—4 by the brakeman first being made. The push buttons PB5—6, PB9—10 and PB11—12 perform similar functions. This feature is particularly desirable under conditions where operation of the track switch is not necessary, as for instance, would be the case if the train V3 in Fig. 32A would desire to make a back-up move.

Referring to Fig. 35A the entrance of the trains V3 and V4 into their respective single track sections has caused the usual danger tumble-down to occur in both single track sections, which controls the signals S7, S9, S2 and S0 to their stop conditions in a manner as illustrated in Figs. 6B and 18A, respectively, so that no further discussion of the signal indications or how they were given is necessary.

Referring now to Figs. 36A and 36B the signals in advance and behind the train V3 assume indications and are controlled in exactly the same way as the train V1 in Figs. 9A and 9B controls the associated signals. Also, the train V4 in Fig. 36A controls signals S0 and S2 located directly ahead and signals S1 and S3 located to the rear thereof in the same manner as the train V2 in Figs. 20A and 20B controls signals S6 and S8 in advance and signals S7 and S9 in the rear thereof. Similarly, the train V3 when assuming the position illustrated in Fig. 37B of the drawings controls signals directly ahead and to the rear thereof in the same manner as the train V1 in Fig. 11B of the drawings controls similar signals in advance and in the rear thereof as had already been discussed in detail. Also, the train V4 of Fig. 37A controls signal S0 in advance and signals S2, S1 and S3 to the rear thereof in exactly the same manner as the train V2 in Fig. 21A controls signal S6 in advance thereof and controls signals S8, S7 and S9 to the rear thereof.

From the foregoing, it is apparent that the absolute-permissive-block signaling system illustrated in Figs. 1A–1D performs unusual functions that afford great flexibility in a system that employs a maximum of only three distinctive controls from one signal location to the next signal location in the rear. To a large extent these additional functions and flexibility are due to the employment of the directional stick relay at each intermediate signal and for each side entering signal for performing functions in addition to those ordinarily performed by the directional stick relay. In the usual absolute-permissive-block signaling system, the directional stick relay is primarily employed to establish a caution circuit for the next signal in the rear through front contacts of such directional stick relay under conditions when the signal with which it is associated assumes the danger or stop condition. In other words, if a signal is at stop and its associated directional stick relay is in its retracted position the next signal in the rear will also indicate stop, but with the directional stick relay in its energized position a caution circuit is established for the next signal in the rear. In the present system, the directional stick relay at each intermediate signal performs the function just mentioned and in addition thereto performs the function of, when in its energized position, causing the next signal in the rear to indicate clear when the signal with which it is associated indicates caution, but to cause the signal in the rear to also indicate caution when the signal with which the stick relay is associated indicates caution provided the directional stick relay is then deenergized. Obviously, in order to perform this latter function the directional stick relay must not only have stick circuits to hold it energized under danger traffic conditions of the associated signal, but must have an additional stick circuit for holding the directional stick relay energized under caution traffic conditions of the adjacent signal. In other words, in the system just described a signal to the rear of an intermediate signal repeats the intermediate signal when the directional stick relay is deenergized, but indicates the next less restrictive signaling condition when the directional stick relay is energized.

MODIFICATION

In Figs. 38 and 39 have been illustrated modified systems which employ the same operating features as Fig. 1 although these features of operation are accomplished by modified circuits and apparatus.

*Structure Fig. 38*

In Fig. 38 has been illustrated a system of absolute-permissive-block signaling which employs wayside signals of the search-light type. The particular search-light type signal illustrated is described in detail in the prior application of Field, Ser. No. 361,060, filed October 14, 1940, and is also embodied in an absolute-permissive-block signaling system in the prior application of Judge, Ser. No. 378,961, filed February 14, 1941. Each of the signals illustrated in Fig. 38 comprises a search-light signal such as described in said application of Field which includes a mechanism M comprising a distant magnet DG and a home-magnet HG. The windings of these magnets are preferably connected in series in a manner as disclosed in said Field application and are so constructed that both of the magnets DG and HG pick up their armatures and contacts when their energizing circuits are energized by current of one polarity and so that only the home-magnet HG and its contacts are picked up when the mechanism M is energized by current of reverse polarity. In other words, the distant magnet DG is a polar magnet which picks up only upon current of normal polarity. The home-magnet HG preferably includes a rectifier which produces retained operating characteristics in this magnet. By retained operating characteristics is meant that the magnet HG will not drop during pole changing of its energizing circuit. These magnets DG and HG mechanically operate a spectacle to place a green colored screen in the beam emitted by a concentrated filament lamp comprising a part of the signal when both of the magnets DG and HG are energized, substitute a caution or yellow screen when only the home magnet HG assumes its attracted position, and substitute a red or danger screen when both of the magnets DG and HG assume their retracted position. These color screens are all mounted on the same element or spectacle and in the order red, yellow, green. The circuits illustrated in Fig. 38 are only the circuits for governing traffic in a west-bound direction although the mechanism M6 for governing traffic in an eastbound direction has also been illustrated. This was done by reason of the fact that its contacts 53⁶ is included in one energizing circuit of polechanger relay 5PC employed for governing westbound traffic. In other words, if the circuits illustrated in Fig. 38 for west-bound traffic are duplicated for east-bound traffic a substantially complete signaling system, such as illustrated in Figs. 1A-1D is disclosed. In fact, the circuits illustrated in Fig. 38 are so near identical to those illustrated in Figs. 1A-1D and for this reason like contacts and devices have been assigned like reference characters, which in some instances have distinctive exponents. It may be pointed out that in the system illustrated in Fig. 38 no polar-neutral line relays are necessary in that the signal mechanism itself comprises a polar-neutral structure, and in that this mechanism has contacts associated therewith which may be used for carrying out relaying functions.

Structure Fig. 39

In Fig. 39 has been conventionally illustrated a system which is identical to that illustrated in Figs. 1A to 1D except that two neutral line circuits are employed in place of each polar line circuit illustrated in Figs. 1A-1D. One of these line circuits may, for convenience, be called the distant line circuit and controls the neutral distant line relay D; whereas, the other line circuit may, for convenience, be called the home-line circuit and controls the home relay H. It may be pointed out that these line circuits are controlled by contacts similar to those employed in Figs. 1A-1D of the drawings, and for this reason like contacts have been assigned like reference characters having in some instances distinctive exponents. It may also be mentioned that the home-line circuit and the distant line circuit for any particular signal are so controlled that both of these line circuits are energized in Fig. 39 under those conditions when the line circuit in Figs. 1A-1D is energized by current of normal polarity, and are so controlled that the home-line circuit only is energized in Fig. 39 when the line circuit illustrated in Figs. 1A-1D is energized by current of reverse polarity. The line circuits are also so controlled that they are both deenergized in Fig. 39 under those conditions when the corresponding line circuit in Figs. 1A-1D is deenergized. The operation of the system illustrated in Fig. 39 insofar as the operating results are concerned is identical to that of the system illustrated in Figs. 1A-1D and for this reason a description of the operation of the system shown in Fig. 39 is deemed unnecessary.

Referring again to Figs. 38 and 39 it may be pointed out that the home-repeater relay 7HGP shown in Fig. 38 of the drawings has been added by reason of the fact that the contact 63⁷ should open prior to the opening of the front contact 58⁷ when the line circuit is momentarily deenergized by the sequential operation of the contact 42⁵⁻⁶ and 43⁵⁻⁶ for the same reason that similar contacts in Fig. 1B should operate in sequence. In other words, contact 58⁷ is a contact of a repeater relay; whereas, the contact 63⁷ is a contact of the relay which controls such repeater relay in Fig. 38 of the drawings as well as in Fig. 1B of the drawings. In Fig. 39 a similar repeater relay 7HP repeats the home relay H7 so that upon momentary dropping of the home relay H7 its contact 63⁷ will drop the directional stick relay 7S before the back contact 58⁷ of the repeater 7HP closes another stick circuit for this stick relay.

Structure Fig. 40

In Fig. 40 of the drawings has been shown a modified control circuit for the intermediate signal of the system shown in Figs. 1A to 1D inclusive. The only difference between the circuits for signal S7 of Fig. 40 and for signal S7 of Fig. 1B is that the contact 82⁹ᴬ of track relay T9A has been added in Fig. 40. This has been done in order to normally hold the intermediate signals at caution as shown, for example, in Figs. 41A to 45B, inclusive. By referring to Fig. 40, it will be seen that the caution signal unit Y is substituted for the clear signal unit G at all times except when the track circuit at the approach to the signal is occupied.

Figs. 41A-52B

Since the operation of the signal system of Figs. 1A-1D when modified in view of the showing in Fig. 40 is not changed except for the signal aspects displayed by the intermediate signals under certain traffic conditions, a description of the system when so modified is believed unnecessary. However, in order to illustrate the signal aspects of the system when so modified, under various traffic conditions Figs. 41A to 52B have been added. In Figs. 41A and 41B have been illustrated the signal aspects under clear traffic conditions, that is when there are no trains around. Attention is directed to the fact that all intermediate signals normally indicate caution. In Figs. 42A to 52B have been illustrated the same traffic conditions as are illustrated in Figs. 2A to 12B respectively the signal aspects in Figs. 42A to 52B, however, being different to the extent performed by contact 82 of the track relay at the approach to the various intermediate signals. Attention is directed to the fact that in Figs. 41A to 52B inclusive no clear signal ever appears at the approach to a stop signal as is the case in Figs. 2A to 13B inclusive, and it was to avoid a clear signal aspect for the first signal to the rear of a signal at stop that prompted the applicants to devise the modified construction (addition of contact 82) illustrated in Fig. 40 of the drawings. Both of these systems (Fig. 1 system and Fig. 40 system) are perfectly safe, but the Fig. 1 system could mislead a hand car or motor car crew in that hand cars and motor cars have insulated axles and do not perform an approach control function. Therefore, a hand car approaching an intermediate signal at clear in the Figs. 1A–1D construction might be surprised by seeing such an intermediate signal suddenly going from clear to stop.

*Fig. 53 construction*

By referring to Figs. 2A to 13B of the drawings, it is readily seen that the so-called caution tumble-down function in the single track stretch in advance of a train is performed when the train enters into the second track circuit on the main track of the passing siding. It is believed that this is the most desirable arrangement in that it seems to give adequate safety and at the same time affords maximum facility for the movement of traffic without undue delay. Some signal engineers may, however, prefer greater safety and less facility and the modified construction shown in Fig. 53 has been provided to produce this. Fig. 53 shows how the energizing circuits for pole-changer relay 5PC of Fig. 1A may be modified so as not to change the Fig. 1 system in any way except to cause the caution tumble-down function to take place when the train enters the last track circuit of the single track stretch to the rear of the single track stretch in which such caution tumble down occurs. It is, of course, understood from the description of Figs. 1A–1D that pole changing of the energizing circuit for the home-distant relay 7HD causes the caution tumble down of signals governing west-bound traffic in single track stretch B to occur. It is also seen from Figs. 1A–1D that the approach of an east-bound train causes pole changing of the energizing circuit for relay 7HD by dropping of the pole-changer relay 5PC due to dropping of track relay T5 and the opening of contact 52⁵, because dropping of relay 5HDP, which dropped earlier, did not deenergize relay 5PC but established a new circuit including this front contact 52⁵. Referring now to Fig. 53 dropping of relay 5HDP, which due to an east-bound train movement occurs upon dropping of track relay T3 causes dropping of pole-changer relay 5PC, pole changing of the energizing circuit for home-distant relay 7HD and a caution tumble down of signals for governing west-bound traffic in single track stretch B. Also, since the dropping of the home-distant repeater relay 5HDP causes dropping of pole-changer relay 5PC, a clear intermediate signal cannot be displayed directly in the rear of an entering signal at stop in the Fig. 53 construction, as is the case in the Figs. 1A–1D construction. In all other respects the modified construction of Fig. 53 functions the same as does the system of Figs. 1A–1D. In other words, the Fig. 53 system differs from the Figs. 1A–1D system only by the omission of contact 52⁵ of track relay T5 and by the omission of the conductor extending from back point of contact 51⁵ of relay 5HDP to front point of contact 53⁶ of relay 6HD in the Figs. 1A–1D construction.

Since the modified system of Fig. 53 functions exactly the same as the system of Figs. 1A–1D except for the differences pointed out above a detailed description of its operation is believed unnecessary.

The applicants have thus devised an absolute-permissive-block signaling system which affords a caution tumble down of signals in a single track section either before a train arrives at a passing siding or when it has reached an intermediate point in the main track of such passing siding and which affords a danger tumble down of signals when such train enters that single track section, and have also disclosed in Figs. 38, 39, 40 and 53 modifications of such systems. These very desirable features are necessary for safety and facility on single track railway systems employing single track sections where less than double braking distance is available between intermediate signals. These caution tumble down and other functions are accomplished without additional line wires over that employed in an absolute-permissive-block signaling system where double braking distance between intermediate signals is available and no caution tumble down of signals is necessary. In fact the signaling systems illustrated may have zero spacing between opposing intermediate signals and will still be safe and facilitate the movement of traffic. That is, the signals S7 and S8 instead of being staggered signals, as shown, could be a pair of opposite signals located at the same signal location, and adequate braking distance would still be available when the novel systems of signaling illustrated are employed. All these advantages have been accomplished without the employment of either, special superimposed currents, superimposed code or centralized traffic control, and by employing merely a maximum of three line wires energized by direct current of one or another polarity or deenergized, one of the line wires constituting a common wire for two line circuits. It is, of course, understood that polarized alternating current line circuits and neutral alternating current track circuits may be used, if desired, without in any way modifying the underlying features and functions of the system.

It is further desired to be understood that various changes, modifications and additions may be made in applying the invention to the various systems and problems encountered in practicing the invention without departing from the spirit or scope of the invention except as demanded by the scope of the following claims.

What we claim as new is:

1. In combination with two single track sections of railway track connected by a passing siding, an intermediate signal in each single track section governing the movement of traffic toward the siding, an entering signal for each of said passing sidings for governing the movement of traffic from the adjacent single track section into such passing siding, means for causing the entering signal adjacent one of said single track sections to be operated to its caution condition but leaving the intermediate signal in the rear thereof in its clear condition when a train approaching said passing siding enters the other of said single track sections with said one single track section and the main track of said passing siding unoccupied, and means including said first mentioned means for causing both the entering signal and the intermediate signal of said one single track section to be operated to their caution conditions when such train approaching said passing siding enters said other single track section at a time when a train approaching said passing siding is occupying said one single track section to the rear of its intermediate signal.

2. In combination with two single track sections of railway track connected by a passing siding, an intermediate signal in each single track section governing the movement of traffic toward the siding, an entering signal at the exit end of each of said single track sections for governing the movement of traffic from such single track section into such passing siding, means for causing the entering signal for one of said single track sections to be operated to its caution condition and leaving the intermediate signal in the rear thereof in its clear condition when a train approaching said passing siding enters the other of said single track sections with said one single track section and the main track of said passing siding unoccupied, control means including said first mentioned means for causing both the entering signal and the intermediate signal of said one single track section to be operated to their caution conditions when such train approaching said passing siding enters said other single track section at a time when an approaching train is occupying said one single track section to the rear of its intermediate signal, said control means including a directional stick relay associated with the entering signal of said one single track section including means to pick it up when a train passes such entering signal in the direction in which it governs traffic and to hold it energized so long as such entering signal indicates either danger or caution for causing the intermediate signal in the rear of such entering signal to indicate clear when such entering signal indicates caution irrespective of whether a train is occupying said one single track section to the rear of such intermediate signal.

3. In combination with two single track sections of railway track connected by a passing siding, an intermediate signal in each single track section governing the movement of traffic toward the siding, an entering signal for each of said single track sections and in advance of such intermediate signal for governing the movement of traffic from such single track section into such passing siding, means for causing the entering signal for one of said single track sections to be operated to its caution condition but leaving the intermediate signal in the rear thereof in its clear condition when a train approaching said passing siding enters the other of said single track sections with said one single track section and the main track of said passing siding unoccupied, and means including said first mentioned means for causing both the entering signal and the intermediate signal of both of said single track sections to be operated to their caution conditions when trains approaching said passing siding from opposite directions enter said respective single track sections.

4. In an absolute-permissive-block signaling system, the combination with two single track sections of railway connected by a passing siding having a main track terminating at signals governing traffic into said single track section, a head-block signal for each single track section for governing traffic into such section in a direction toward said passing siding, an intermediate signal for each of said single track sections located in advance of said head-block signal for governing traffic in the same direction as said head-block signal, means for causing the head-block signal and the intermediate signal immediately in advance thereof in one single track section to indicate caution when an opposing train passes an intermediate point in the main track of said passing siding, means for causing said head-block signal and said intermediate signal of said one single track section to indicate stop when said opposing train enters said one single track section, and directional stick relay means associated with such intermediate signal for causing such head-block signal to indicate clear when said intermediate signal indicates caution and said directional stick relay means assumes its energized condition.

5. In an absolute-permissive-block signaling system, the combination with a plurality of single track sections of railway connected by passing sidings, a head-block signal for governing the entrance of trains in each direction of travel into each single track section, an intermediate signal for each direction of travel in each of said single track sections, means for causing a head-block signal and the intermediate signal immediately in advance thereof and governing traffic in the same direction in one single track section to indicate caution when an opposing train passes a point to the rear of the entrance end for such opposing train to said one single track section, and means for causing said head-block signal and said intermediate signal of said one single track section to indicate stop and a signal located to the rear of said head-block signal and governing traffic in the same direction and the intermediate signal in the rear thereof and also governing traffic in the same direction to indicate caution only if there is a train approaching said second mentioned intermediate signal when said opposing train enters said one single track section.

6. In an absolute-permissive-block signaling system, the combination with two single track sections of railway connected by a passing siding, a head-block signal for each direction of travel and an intermediate signal for each direction of travel in each of said single track sections said head-block signals governing the entrance of trains into such single track sections and toward such intermediate signal, an entering signal at each end of said passing siding for governing the movement of trains into that end of such passing siding, means for causing the head-block signal and the intermediate signal immediately in advance thereof in one single track section to indicate caution and the entering signal in advance of such intermediate signal to indicate stop when an opposing train passes an intermediate point in said passing siding, and means for causing said head-block signal and said intermediate signal in advance thereof and governing traffic in the same direction of said one single track section to indicate stop and the entering signal to the rear of said head-block signal to indicate caution when said opposing train enters said one single track section.

7. In an absolute-permissive-block signaling system for a single track railway system having passing sidings, intermediate signals for each single track section connecting two passing sidings, a line relay means for each intermediate signal which may assume a clear, a caution or a danger traffic position, a directional stick relay associated with each intermediate signal for in combination with the line relay means controlling such signal to govern the next signal in the rear thereof, a pick-up circuit for each directional stick relay including contacts which are closed if a train passes such signal in the direction such signal governs traffic, and stick circuit means for each directional stick relay for energizing such stick relay through a front stick contact thereof when the associated line relay means assumes either the danger or the caution position.

8. In an absolute-permissive-block signaling system for a single track railway system having passing sidings, intermediate signals for each single track section connecting two passing sidings, said signals including electro-responsive means which may assume a clear, a caution or a danger traffic position, a directional stick relay associated with each intermediate signal for in combination with its electro-responsive means governing the next signal in the rear thereof, a pick-up circuit for each directional stick relay including contacts which are closed if a train passes such signal in the direction such signal governs traffic, stick circuit means for each directional stick relay for energizing such stick relay through a front stick contact thereof when the associated electro-responsive means assumes either the danger or the caution position and manually controllable means for dropping said stick relay through the medium of said electro-responsive means.

9. In an absolute-permissive-block signaling system for a single track relay system having passing sidings, intermediate signals for each single track section connecting two passing sidings, said signals including electro-responsive means for controlling the same which may assume a clear, a caution or a danger traffic position, a directional stick relay associated with each intermediate signal for in combination with the associated electro-responsive means governing the next signal in the rear thereof, a pick-up circuit for each directional stick relay including contacts which are closed if a train passes such signal in the direction such signal governs traffic, and two stick circuits for each directional stick relay one of which is closed if the electro-responsive means of the associated signal assumes the danger position and the other of which is closed if the electro-responsive means of the associated signal assumes the caution position.

10. In an absolute-permissive-block signaling system for a single track railway system having passing sidings, intermediate signals for each single track section connecting two passing sidings, said signals including electro-responsive means for controlling the same which may assume an energized clear, an energized caution or a deenergized danger traffic position, a directional stick relay associated with each intermediate signal for in combination with the associated electro-responsive means governing the next signal in the rear thereof, a pick-up circuit for each directional stick relay including contacts which are closed if a train passes such signal in the direction such signal governs traffic, a slow-acting relay associated with each of said electro-responsive means and energized if said electro-responsive means assumes either the clear or the caution position, and two stick circuits for each directional stick relay one of which is closed if the electro-responsive means of the associated signal assumes the caution position and the other of which includes a back contact of said slow-acting relay, whereby said directional stick relay is maintained energized during the continued deenergization of said electro-responsive means but is dropped upon momentary deenergization of said electro-responsive means following energization thereof to its caution position.

11. In an absolute-permissive-block signaling system including a single track section connecting two passing sidings; a head-block signal at each end of said single track section for governing the movement of traffic into said single track section at that end; an entering signal at each end of said single track section for governing the movement of traffic from that end of said single track section into the passing siding adjacent that end of the single track section; an intermediate signal to the rear of each of said entering signals for governing the movement of traffic toward such entering signal; polar electro-responsive means for each signal to cause such signal to display a clear, a caution and a danger indication when such electro-responsive means is energized by current of normal polarity, of reverse polarity and is deenergized respectively; a line circuit for each intermediate signal for governing its electro-responsive means; a directional stick relay associated with each entering signal; and means at said entering signal for energizing such line circuit for said intermediate signal in five different manners, the first manner of energization consisting of energizing said line circuit with current of normal polarity only if the electro-responsive means of said entering signal assumes the clear position, the second manner of energization consisting of energizing said line circuit with current of normal polarity only if the electro-responsive means for the entering signal assumes the caution position and its associated directional stick relay is energized, the third manner of energization consisting of energizing said line circuit with current of normal polarity only if the electro-responsive means of said entering signal assumes its caution position, said electro-responsive means of the head-block signal adjacent said entering signal assumes the energized position and the directional stick relay associated with said entering signal is deenergized, the fourth manner of energization of said line circuit consisting of energizing said line circuit with current of reverse polarity only if said electro-responsive means of said entering signal assumes the caution position and both the directional stick relay associated with said entering signal and the electro-responsive means of the head-block signal adjacent said entering signal assume their deenergized positions and the fifth manner of energization of said line circuit consisting of energizing said line circuit with current of reverse polarity only if the electro-responsive means of said entering signal assumes its danger position.

12. In an absolute-permissive-block signaling system including a single track section connecting two passing sidings; a head-block signal at each end of said single track section for governing the movement of traffic into said single track section at that end; an entering signal at each end of said single track section for governing the movement of traffic from that end of said single track section into the passing siding adjacent that end of the single track section; an intermediate signal to the rear of each of said entering signals for governing the movement of traffic toward such entering signal; polar electro-responsive means for each signal to cause such signal to display a clear, a caution and a danger indication when such electro-responsive means is energized by current of normal polarity, of reverse polarity or is deenergized respectively; a line circuit for each intermediate signal for governing its electro-responsive means; a directional stick relay associated with each entering signal; and circuit branches at said entering signal in advance of such intermediate signals for causing the energization of such line circuit for said intermediate signal by current of reverse polarity, the first of which causes the energization of said line circuit with current of reverse polarity only if said electro-responsive means of said entering signal assumes the caution position and both the directional stick relay associated with said entering signal and the electro-responsive means of the head-block signal adjacent said entering signal assume their deenergized positions and the second of which energizes said line circuit with current of reverse polarity only if the electro-responsive means of said entering signal assumes its danger position.

13. In an absolute-permissive-block signaling system including a single track section connecting two passing sidings; a head-block signal at each end of said single track section for governing the movement of traffic into said single track section at that end; an entering signal at each end of said single track section for governing the movement of traffic from that end of said single track section into the passing siding adjacent that end of the single track section; an intermediate signal to the rear of each of said entering signals for governing the movement of traffic toward such entering signal; polar electro-responsive means for each signal to cause such signal to display a clear, a caution and a danger indication when such electro-responsive means is energized by current of normal polarity, of reverse polarity or is deenergized respectively; a line circuit for each intermediate signal for governing its electro-responsive means; a directional stick relay associated with each entering signal; and means for energizing such line circuit with current of normal and reverse polarity when the electro-responsive means of the head-block signal adjacent the entering signal in advance of such intermediate signal is energized and deenergized respectively, provided the electro-responsive means for such entering signal assumes the caution position and its associated directional stick relay is deenergized.

14. In an absolute-permissive-block signaling system including a single track section connecting two passing sidings; a head-block signal at each end of said single track section of governing the movement of traffic into said single track section at that end; an entering signal at each end of said single track section for governing the movement of traffic from that end of said single track section into the passing siding adjacent that end of the single track section; an intermediate signal to the rear of each of said entering signals for governing the movement of traffic toward such entering signal; polar electro-responsive means for each signal to cause such signal to display a clear, a caution and a danger indication when such electro-responsive means is energized by current of normal polarity, of reverse polarity or is deenergized respectively; a line circuit for each intermediate signal for governing its electro-responsive means; a directional stick relay associated with each entering signal; and means for energizing such line circuit with current of normal and reverse polarity when the stick relay associated with the entering signal directly in advance of said intermediate signal is in its attracted and retracted position respectively provided the electro-responsive means of the head-block signal adjacent said entering signal is in its deenergized condition and the electro-responsive means of the entering signal is in its caution position.

15. In an absolute-permissive-block signaling system including a single track section connecting two passing sidings; a head-block signal at each end of said single track section for governing the movement of traffic into said single track section at that end; an entering signal at each end of said single track section for governing the movement of traffic from that end of said single track section into the passing siding adjacent that end of the single track section; an intermediate signal to the rear of each of said entering signals for governing the movement of traffic toward such entering signal; polar electro-responsive means for each signal to cause such signal to display a clear, a caution and a danger indication when such electro-responsive means is energized by current of normal polarity, of reverse polarity or is deenergized respectively; a line circuit for each intermediate signal for governing its electro-responsive means; a directional stick relay associated with each entering signal; and means for energizing such line circuit with current of normal and reverse polarity when the electro-responsive means of said entering signal directly ahead of such intermediate signal is energized to its clear and its caution position respectively provided the electro-responsive means of the head-block signal adjacent such entering signal and the directional stick relay associated with such entering signal are both in their deenergized position.

16. In an absolute-permissive-block signaling system including a single track section connecting two passing sidings; a head-block signal at each end of said single track section for governing the movement of traffic into said single track section; an intermediate signal in advance of each head-block signal for governing traffic in the same direction as said head-block signal governs traffic; a polar line relay capable of assuming a clear, a caution, or a danger position associated with each of said signals; a line circuit for each of the line relays associated with a head-block signal extending to the intermediate signal in advance thereof governing traffic in the same direction; a directional stick relay associated with each of said intermediate signals; and four branch circuits at each intermediate signal for energizing the line circuit extending to the head-block signal in the rear, the first of which is closed to energize the line circuit with current of normal polarity only if the line relay associated with such intermediate signal assumes the clear position, the second of which is closed to energize the line circuit with current of normal polarity only if the associated line relay assumes the caution position and the associated directional stick relay assumes its energized position, the third of which is closed to energize the line circuit with current of reverse polarity only if the associated line relay assumes the caution position and the associated directional stick relay is deenergized and the fourth of which is closed to energize the line circuit with current of reverse polarity only if the associated line relay assumes its danger position and said directional stick relay assumes its energized position.

17. In an absolute-permissive-block signaling system including a single track section connecting two passing sidings; a head-block signal at each end of said signal track section for governing the movement of traffic into said single track section; an intermediate signal in advance of each head-block signal for governing traffic in the same direction as said head block signal governs traffic, each of said signals including polar electroresponsive means capable of controlling such signal to a clear, a caution, or a danger position when energized with current of normal polarity or reverse polarity and deenergized respectively; a line circuit for each of said head-block signals extending to the intermediate signal in advance thereof and governing traffic in the same direction; a directional stick relay associated with each of said intermediate signals and including means to pick it up when a train passes such signal in the direction in which such signal governs traffic and to maintain it up until the associated polar electro-responsive means manifests clear, and four branch circuits at each intermediate signal for energizing the line circuit extending to the head-block signal in the rear thereof, the first of which is closed to energize the line circuit with current of normal polarity only if the electro-responsive means of the intermediate signal assumes the clear position, the second of which is closed to energize the line circuit with current of normal polarity only if the electro-responsive means assumes the caution position and the associated directional stick relay assumes its energized position, the third of which is closed to energize the line circuit with current of reverse polarity only if the electro-responsive means assumes the caution position and the associated directional stick relay is deenergized and the fourth of which is closed to energize the line circuit with current of reverse polarity only if the electro-responsive means assumes its danger position and said directional stick relay assumes its energized position.

18. In an absolute-permissive-block signaling system including a single track section connecting two passing sidings; a head-block signal at each end of said single track section for governing the movement of traffic into said single track section; an intermediate signal in advance of each head-block signal for governing traffic in the same direction as said head-block signal governs traffic; each of said signals being provided with electro-responsive means capable of assuming a clear, a caution, or a danger position when energized by current in one manner, in another manner and deenergized respectively; line circuits for each of the electro-responsive means associated with a head-block signal extending to the intermediate signal in advance thereof governing traffic in the same direction; a directional stick relay associated with each of said intermediate signals; and means for energizing the line circuit extending to the head-block signal in the rear of such intermediate signal by current in one manner if the associated electro-responsive means assumes the clear position, and in the same manner if the associated electro-responsive means assumes the caution position and the associated directional stick relay assumes its energized position.

19. In an absolute-permissive-block signaling system including a single track section connecting two passing sidings; a head-block signal at each end of said single track section for governing the movement of traffic into said single track section; an intermediate signal in advance of each head-block signal for governing traffic in the same direction as said head-block signal governs traffic; each of said signals being provided with electro-responsive means capable of assuming a clear, a caution, or a danger position when energized by current in one manner, in another manner and deenergized respectively; line circuits for each of the electro-responsive means associated with a head-block signal extending to the intermediate signal in advance thereof governing traffic in the same direction; a directional stick relay associated with each of said intermediate signals; and means for energizing the line circuits extending to the head-block signal in the rear thereof by current in said another manner if the associated electro-responsive means assumes the caution position and the associated directional stick relay assumes its deenergized position and by current in the same manner if the associated electro-responsive means assumes its danger position and said directional stick relay assumes its energized position.

20. In a single track railway signaling system; the combination with two single track sections joined by a passing siding; a head-block signal at each end of said passing siding for governing the movement of traffic from the passing siding into the adjacent single track section; an entering signal adjacent each head-block signal for governing the movement of traffic from the adjacent single track section into the passing siding; an intermediate signal in each of said single track sections for governing the movement of traffic toward said entering signal for that single track section, each of which signals include traffic manifesting means capable of manifesting clear, caution, and danger traffic; a directional stick relay associated with each of said entering signals which is picked up if a train moving in the direction governed by said entering signal passes said entering signal and which remains picked up until the traffic manifesting means of such entering signal has again been actuated to its clear condition; and means for controlling the intermediate signal in a particular single track section to its caution indicating condition when the traffic manifesting means of said head-block signal and said entering signal in advance thereof and in said particular single track section manifest danger and caution traffic conditions respectively provided said directional stick relay then assumes its retracted position.

21. In a single track railway signaling system; the combination with two single track sections joined by a passing siding; a head-block signal at each end of said passing siding for governing the movement of traffic from the passing siding into the adjacent single track section; an entering signal adjacent each head-block signal for governing the movement of traffic from the adjacent single track section into the passing siding; an intermediate signal in each of said single track sections for governing the movement of traffic toward said entering signal for that single track section; each of which signals include traffic manifesting means capable of manifesting clear, caution and danger traffic; and means for controlling the intermediate signal in a particular single track section to its caution indicating condition when the traffic manifesting means of said head-block signal and said entering signal in advance thereof and in said particular single track section manifest danger and caution traffic conditions respectively.

22. In an absolute-permissive-block signaling system for railways; the combination with two passing sidings connected by a single track section; a head-block signal at each end of said single track section for governing the movement of traffic into said section at that end; an intermediate signal in advance of each head-block signal for governing traffic in the same direction as such head-block signal and provided with traffic manifesting means capable of manifesting clear, caution and danger traffic conditions respectively; a directional stick relay associated with each intermediate signal picked up when a train passes such intermediate signal moving in the direction in which said intermediate signal governs traffic and which remains energized until the traffic manifesting means of said intermediate signal again manifests clear traffic conditions; and means for controlling the head-block signal to the rear of such intermediate signal to its clear condition when the traffic manifesting means of said intermediate signal assumes the clear condition or if it assumes its caution condition and the associated directional stick relay is energized.

23. In an absolute-permissive-block signaling system for railways; the combination with two passing sidings connected by a single track section; a head-block signal at each end of said single track section for governing the movement of traffic into said section at that end; an intermediate signal in advance of each head-block signal for governing traffic in the same direction as such head-block signal and provided with traffic manifesting means capable of manifesting clear, caution and danger traffic conditions respectively; a directional stick relay associated with each intermediate signal picked up when a train passes such intermediate signal moving in the direction in which said intermediate signal governs traffic and which remains energized until the traffic manifesting means of said intermediate signal again manifests clear traffic conditions; and means for controlling the head-block signal to the rear of such intermediate signal to its caution condition when the traffic manifesting means of said intermediate signal assumes either its caution condition with the associated directional stick relay in its retracted condition or assumes its danger condition with the associated directional stick relay in its attracted condition.

24. In combination with a single track section of railway; an advance signal; a second signal in the rear thereof governing traffic in the same direction and toward said advance signal; each of said signals including electro-responsive means for causing such signal to indicate clear, caution and danger respectively when such means is energized in a first manner, in a second manner or is left deenergized respectively; a first means for controlling said second signal to the clear and the caution condition as said advance signal assumes the clear and the caution condition respectively; and a second means including said first means for controlling said advance signal to its caution condition when a train passes said second signal in the direction governed by said signals only if a particular stretch of track in advance is occupied by an opposing train.

25. In an absolute-permissive-block signaling system, the combination with two single track sections of railway connected by a passing siding having a main track terminating at signals governing traffic into and out of said single track sections, a a head-block signal for each single track section for governing traffic into such section in a direction toward said passing siding, an intermediate signal for each of said single track sections located in advance of said head-block signal for governing traffic in the same direction as said head-block signal, means for causing the head-block signal and the intermediate signal immediately in advance thereof in one single track section to indicate caution when an opposing train passes an intermediate point in the main track of said passing siding, and means including said means for causing said head-block signal and said intermediate signal of said one single track section to indicate stop when said opposing train enters said one single track section.

26. In combination, a railway track divided into sections by insulating joints, a track circuit for each section including a track relay, a signal located at one junction between sections and governing traffic in one direction over the track section on one side of said junction, control means including said track relays of at least two sections in advance of said signal and assuring a clear, a caution or a danger condition in accordance with traffic conditions in advance, and means including the track relay of the section immediately to the rear of said signal for causing said signal to indicate caution irrespective of whether said control means assumes the clear or caution condition if said last mentioned track relay is then energized but to indicate clear when said control means assumes the clear condition if the said last mentioned track relay is then deenergized.

27. In combination, two single track stretches connected together by a passing siding, a head-block signal for governing the movement of traffic from the main track of said passing siding into one of said single track stretches, a second signal for governing the movement of traffic in the opposite direction and from said one single track stretch into said main track, an intermediate signal in said one single track stretch and governing the movement of traffic toward said second signal, a home-distant relay means for each of said signals, and means including the home-distant relay means for said intermediate signal and controlled by the home-distant relay means for said head-block signal and said second signal and effective if the home-distant relay means for said head-block signal manifests danger traffic conditions due to the entrance of a train into the opposite end of said one single track stretch and if said second signal manifests caution traffic conditions due to the entrance of a train into the opposite end of the other single track stretch for in response to such home-distant relay means traffic manifestations causing said intermediate signal to assume a caution condition through the medium of its associated home-distant relay means.

28. In combination, two single track stretches connected together by a passing siding, a head-block signal for governing the movement of traffic from the main track of said passing siding into one of said single track stretches, a second signal for governing the movement of traffic in the opposite direction and from said one single track stretch into said main track, an intermediate signal in said one single track stretch and governing the movement of traffic toward said second signal, a home-distant relay means for each of said signals, and means including the home-distant relay means for said intermediate signal and controlled by the home-distant relay means for said head-block signal and said second signal and effective if the home-distant relay means for said head-block signal manifests clear traffic conditions and said home-distant relay means for said second signal manifests caution due to the entrance of an opposing train in the remote end of said other single track stretch to cause said intermediate signal to indicate clear and for causing said intermediate signal to indicate caution if the home-distant relay means for said second signal manifests caution and said home-distant relay means for said head-block signal manifests stop traffic conditions due to the entrance of a train into the opposite end of said one single track stretch.

29. In an absolute-permissive-block signaling system; the combination with a single track stretch connecting two passing sidings; an entering signal at each end of said stretch for governing the movement of traffic from said stretch into such passing siding; an intermediate signal to the rear of each entering signal governing the movement of traffic toward such entering signal; control means for each of said entering signals for manifesting clear, caution and danger in accordance with traffic conditions in advance of such entering signal to cause such entering signal to indicate clear, caution and danger respectively; a directional stick relay associated with each of said entering signals; a pick-up circuit for each stick relay closed when a train passes such signal in the direction in which such signal governs traffic; a stick circuit means for each stick relay for holding such stick relay energized so long as the associated control means manifests either danger or caution traffic conditions and which causes deenergization thereof when such control means manifests clear traffic conditions; and means for controlling each intermediate signal so as to indicate caution when the control means for the entering signal in advance thereof manifests caution if the associated directional stick relay then assumes its deenergized position and so as to indicate clear if the associated directional stick relay then assumes its energized position.

30. In an absolute-permissive-block signaling system; the combination with a single track stretch connecting two passing sidings; a head-block signal at each end of said stretch for governing the movement of traffic from the adjacent passing siding into said stretch; an intermediate signal in advance of each head-block signal for governing the movement of traffic in the same direction as such head-block signal; control means for each of said intermediate signals for manifesting clear, caution, and danger in accordance with traffic conditions in advance of such intermediate signal to cause such intermediate signal to indicate clear, caution and danger as said control means manifests clear, caution and danger, respectively; a directional stick relay associated with each of said intermediate signals having a pick-up circuit which is closed when a train passes such intermediate signal in the direction in which such signal governs traffic and having stick circuit means for holding such stick relay energized only so long as the associated control means manifests either danger or caution traffic conditions; and means for controlling each head-block signal so as to indicate caution when the control means for the intermediate signal in advance thereof manifests caution if the associated directional stick relay then assumes its deenergized position and so as to indicate clear if the associated directional stick relay then assumes its energized position.

31. In an absolute-permissive-block signaling system; the combination with a single track stretch connecting two passing sidings; a head-block signal at each end of said stretch for governing the movement of traffic from the adjacent passing siding into said stretch; an intermediate signal in advance of each head-block signal for governing the movement of traffic in the same direction as such head-block signal; control means for each of said intermediate signals for manifesting clear, caution, and danger in accordance with traffic conditions in advance of such intermediate signal to cause such intermediate signal to indicate clear, caution and danger in response to clear, caution and danger manifestations respectively of said control means; a directional stick relay associated with each of said intermediate signals having a pick-up circuit which is closed when a train passes such intermediate signal in the direction in which such signal governs traffic and having stick circuit means for holding such stick relay energized only so long as the associated control means manifests either danger or caution traffic conditions; and means for controlling each head-block signal so as to indicate danger when the control means for the intermediate signal in advance thereof manifests danger if the associated directional stick relay then assumes its deenergized position and so as to indicate caution if the associated directional stick relay then assumes its energized position.

32. In an absolute-permissive-block signaling system; the combination with a single track stretch connecting two passing sidings; a head-block signal at each end of said stretch for governing the movement of traffic from the adjacent passing siding into said stretch; an intermediate signal in advance of each head-block signal for governing the movement of traffic in the same direction as such head-block signal; control means for each of said intermediate signals for manifesting clear, caution, and danger in accordance with traffic conditions in advance of such intermediate signal to cause such intermediate signal to indicate clear, caution and danger as said control means manifests clear, caution and danger, respectively; a directional stick relay associated with each of said intermediate signals having a pick-up circuit which is closed when a train passes such intermediate signal in the direction in which such signal governs traffic and having stick circuit means for holding such stick relay energized only so long as the associated control means manifests either danger or caution traffic conditions; and means for controlling each head-block signal so as to indicate caution and danger when the control means for the intermediate signal in advance thereof manifests caution and danger respectively if the associated directional stick relay then assumes its deenergized position and so as to indicate clear and caution respectively if the associated directional stick relay then assumes its energized position.

33. In an absolute-permissive-block signaling system; the combination with a single track stretch connecting two passing sidings; an entering signal at each end of said stretch for governing the movement of traffic from that end into the main track of the adjacent passing siding; an intermediate signal to the rear of each entering signal for governing the movement of traffic toward such entering signal; a head-block signal to the rear of each intermediate signal for governing the movement of traffic from the adjacent passing siding into said stretch and toward the associated intermediate signal; control means for each signal to control such signal to indicate clear, caution or stop when such control means manifests clear, caution or stop respectively; a stick relay associated with each entering signal and each intermediate signal; means for momentarily energizing each stick relay when a train passes the associated signal in the direction in which such signal governs traffic; a stick circuit for each stick relay for holding such stick relay energized only if the control means for the associated signal manifests either danger or caution; and means including said control means for an intermediate signal and the head-block signal to the rear thereof for causing such intermediate signal to indicate caution and the head-block signal in the rear thereof to indicate clear if the control means for the entering signal in advance thereof manifests danger and the stick relay associated with the intermediate signal assumes its energized position but to cause such head-block signal to indicate caution if such stick relay assumes the deenergized position and to cause the intermediate signal to indicate clear if the control means for the entering signal in advance thereof manifests caution and the stick relay associated with such entering signal assumes its energized position but to indicate caution if such stick relay assumes its deenergized position.

34. In an absolute-permissive-block signaling system; the combination with a single track stretch connecting two passing sidings; an entering signal at each end of said stretch for governing the movement of traffic from that end into the main track of the adjacent passing siding; an intermediate signal to the rear of each entering signal for governing the movement of traffic toward such entering signal; a head-block signal to the rear of each intermediate signal for governing the movement of traffic from the adjacent passing siding into said stretch and toward the associated intermediate signal; control means for each signal to control such signal to indicate clear, caution or stop when such control means manifests clear, caution or stop respectively; a stick relay associated with each entering signal and each intermediate signal; means for momentarily energizing each stick relay when a train passes the associated signal in the direction in which such signal governs traffic; a stick circuit for each stick relay for holding such stick relay energized only if the control means for the associated signal manifests either danger or caution; and means including said control means for an intermediate signal and the head-block signal to the rear thereof for causing such intermediate signal to indicate caution and the head-block signal in the rear thereof to indicate clear if the control means for the entering signal in advance thereof manifests danger and the stick relay associated with the intermediate signal assumes its energized position but to cause such head-block signal to indicate caution if such stick relay assumes the deenergized position and to cause the intermediate signal to indicate clear if the control means for the entering signal in advance thereof manifests caution and the stick relay associated with such entering signal assumes its energized position but to indicate caution if such stick relay assumes its deenergized position, and to cause such head-block signal to indicate caution when the control means for the intermediate signal in advance thereof manifests danger if the stick relay associated with such intermediate signal assumes its energized position but to indicate danger if such stick relay assumes its deenergized position.

35. In combination with a single track section of railway; an advance signal; a second signal in the rear of said advance signal and governing traffic in the same direction and toward said advance signal; each of said signals including electro-responsive means for causing such signal to indicate clear, caution and danger respectively when such means is energized in a first manner, in a second manner or is left deenergized respectively; means for controlling said second signal to the clear and the caution condition as said advance signal assumes the clear and the caution condition respectively; a third signal in advance of said advance signal and governing traffic in the opposite direction; and means including the electro-responsive means of said third signal and responsive to the presence of two trains for controlling said advance signal to its caution condition when one of said trains passes said second signal in the direction governed by said signals only if the other of said trains is moving in the opposite direction and occupies a particular stretch of track in the rear of said third signal.

36. In combination, an absolute-permissive-block signaling system including a single track section, an intermediate signal in said section, a second signal to the rear of said intermediate signal governing traffic in the same direction, a directional stick relay associated with said intermediate signal having a pick-up circuit closed when a train passes such signal in the direction such signal governs traffic and having holding circuits which maintain it energized until said intermediate signal assumes its clear indicating condition, means for controlling said second signal to its caution indicating condition when said intermediate signal assumes its caution indicating condition if said directional stick relay is then in its deenergized condition and for controlling such second signal to its clear condition when said intermediate signal assumes such caution indicating condition if said directional stick relay is then in its energized condition, and means manually controllable for dropping said directional stick relay effective only if said intermediate signal then assumes the caution position.

OSBORNE B. WEBSTER.
NELSON B. COLEY.